(12) United States Patent
Yamada et al.

(10) Patent No.: US 9,124,159 B2
(45) Date of Patent: Sep. 1, 2015

(54) ELECTROMAGNETIC ROTARY ELECTRIC MACHINE

(75) Inventors: Eiji Yamada, Owariasahi (JP); Ryoji Mizutani, Nagoya (JP); Shintaro Chinen, Toyota (JP); Kenji Hiramoto, Owariasahi (JP); Hideo Nakai, Nisshin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 337 days.

(21) Appl. No.: 13/494,556

(22) Filed: Jun. 12, 2012

(65) Prior Publication Data
US 2012/0313492 A1  Dec. 13, 2012

(30) Foreign Application Priority Data
Jun. 13, 2011 (JP) .................. 2011-131190

(51) Int. Cl.
| | |
|---|---|
| H02K 11/04 | (2006.01) |
| H02K 3/48 | (2006.01) |
| H02K 3/52 | (2006.01) |
| H02K 1/24 | (2006.01) |
| H02K 19/12 | (2006.01) |

(52) U.S. Cl.
CPC .................. *H02K 3/527* (2013.01); *H02K 1/24* (2013.01); *H02K 19/12* (2013.01)

(58) Field of Classification Search
CPC .................................. H02K 19/12; H02K 1/24
USPC .................. 310/198, 186, 187, 210
See application file for complete search history.

(56) References Cited

U.S. PATENT DOCUMENTS

| | | | | |
|---|---|---|---|---|
| 2,385,101 | A * | 9/1945 | Norman | 324/76.75 |
| 2,385,670 | A * | 9/1945 | Whiting | 310/149 |
| 7,619,344 | B2 * | 11/2009 | Osawa et al. | 310/198 |
| 7,880,424 | B2 * | 2/2011 | Seguchi | 318/712 |
| 8,350,437 | B2 * | 1/2013 | Doushita et al. | 310/198 |
| 8,492,949 | B2 * | 7/2013 | Maruyama | 310/194 |
| 8,519,590 | B2 * | 8/2013 | Baba | 310/198 |
| 2006/0220489 | A1 * | 10/2006 | Osawa et al. | 310/198 |
| 2008/0079375 | A1 * | 4/2008 | Seguchi | 318/139 |
| 2008/0185933 | A1 * | 8/2008 | Baba | 310/198 |
| 2010/0259136 | A1 * | 10/2010 | Hiramoto et al. | 310/68 D |

(Continued)

FOREIGN PATENT DOCUMENTS

| | | | | |
|---|---|---|---|---|
| GB | 2235598 | A * | 3/1991 | H02P 7/00 |
| JP | 2009-112091 | A | 5/2009 | |

(Continued)

*Primary Examiner* — Alex W Mok
(74) *Attorney, Agent, or Firm* — Kenyon & Kenyon LLP

(57) ABSTRACT

A stator that includes stator windings wound around teeth. A rotor includes: a rotor core; rotor windings wound around main salient poles of the rotor; and a diode serving as a magnetic characteristic adjustment portion that causes magnetic characteristics produced on the main salient poles by electromotive forces induced in the rotor windings to differ in the circumferential direction of the rotor. The rotor has auxiliary salient poles that are each protruded from a side surface of each main salient pole in the circumferential direction. In each of rotor slots formed between the main salient poles adjacent to each other in the circumferential direction, the auxiliary salient poles adjacent to each other in the circumferential direction are connected to each other within the rotor slot. In each rotor slot, at least a portion of the rotor windings is disposed radially inside the auxiliary salient poles.

13 Claims, 11 Drawing Sheets

(56) References Cited

U.S. PATENT DOCUMENTS

| | | | |
|---|---|---|---|
| 2011/0050025 A1* | 3/2011 | Doushita et al. | 310/198 |
| 2011/0193444 A1* | 8/2011 | Maruyama | 310/215 |
| 2012/0313492 A1 | 12/2012 | Yamada et al. | |

FOREIGN PATENT DOCUMENTS

| | | | | |
|---|---|---|---|---|
| JP | 2009142120 A * | 6/2009 | | |
| JP | 2009142130 A * | 6/2009 | | |
| JP | 2010136524 A * | 6/2010 | | |
| JP | 2012-170252 A | 9/2012 | | |
| JP | 2012-222940 A | 11/2012 | | |
| JP | 2012-257431 A | 12/2012 | | |
| JP | 2013-005487 A | 1/2013 | | |
| JP | 2013-005510 A | 1/2013 | | |
| JP | 2013-005566 A | 1/2013 | | |
| WO | WO 2009057467 A1 * | 5/2009 | | |
| WO | WO 2010140208 A1 * | 12/2010 | | H02K 1/24 |
| WO | WO 2010140209 A1 * | 12/2010 | | H02K 19/12 |
| WO | 2012/110883 A2 | 8/2012 | | |
| WO | 2012/137056 A2 | 10/2012 | | |

\* cited by examiner

ROTATION DIRECTION OF ROTOR

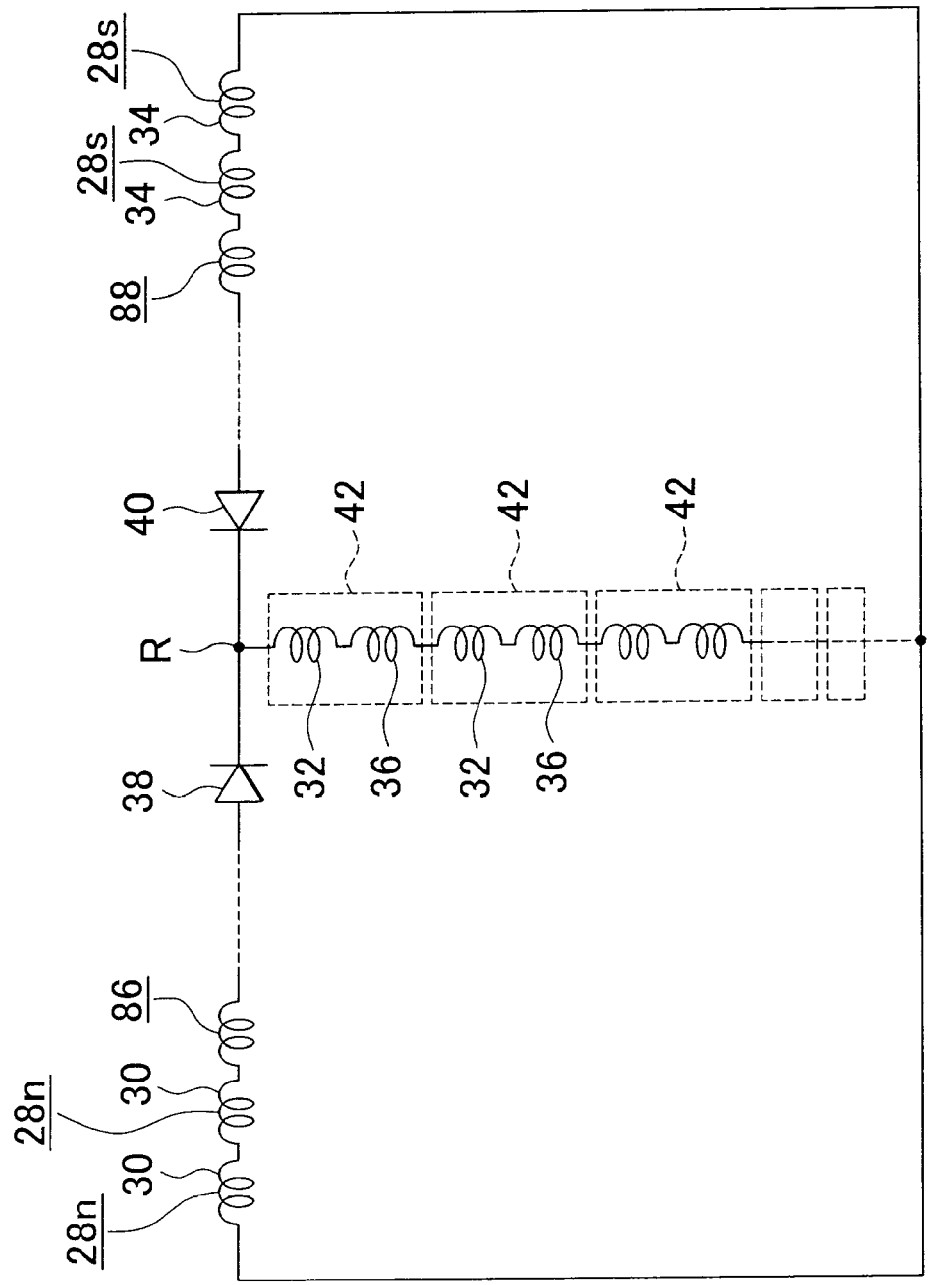

ELECTROMAGNETIC ROTARY ELECTRIC MACHINE

INCORPORATION BY REFERENCE

The disclosure of Japanese Patent Application No. 2011-131190 filed on Jun. 13, 2011 including the specification, drawings and abstract is incorporated herein by reference in its entirety.

BACKGROUND OF THE INVENTION

1. Field of the Invention

The invention relates to an electromagnetic rotary electric machine in which a stator and a rotor are disposed facing each other.

2. Description of Related Art

As described in Japanese Patent Application Publication No. 2009-112091 (JP 2009-112091 A), an electromagnetic rotary electric machine is available, in which a stator and a rotor are disposed facing each other, and that includes salient poles provided at a plurality of locations on the rotor that are spaced from each other in the circumferential direction of the rotor, rotor windings that are wound around the salient poles and that are separate from each other, and diodes that are connected to respective rotor windings. The diodes each rectify the electric current that flows through a corresponding one of the rotor windings so that salient poles adjacent to each other in the circumferential direction of the rotor are magnetized in opposite directions. The stator has teeth that are provided at a plurality of locations on a stator core that are spaced from each other in the circumferential direction. Around the teeth of the stator, stator windings of a plurality of phases are wound by a concentrated winding method. By passing alternating electric currents of a plurality of phases through the stator windings of the plurality of phases, a rotating magnetic field that rotates in a circumferential direction is generated. Due to spatial harmonics that are harmonic components that occur in a distribution of magnetomotive forces produced around the stator, induced currents are created in the rotor windings, so that N poles and S poles are formed in the salient poles alternately in the circumferential direction of the rotor and thus torque is produced on the rotor. At this time, as the currents rectified by the diodes flow through the rotor windings, the salient poles are magnetized to produce magnets whose magnetic poles are fixed.

In such an electromagnetic rotary electric machine, the salient poles interact with the rotating magnetic field of the stator so that torque acts on the rotor. Besides, the torque that acts on the rotor can be efficiently increased by utilizing a harmonic component of the magnetic field formed by the stator.

In this rotary electric machine, the salient poles of the rotor are provided with rotor windings. When the rotor rotates, centrifugal force acts on the rotor windings, exerting force that urges the rotor windings to the radially outer side. As a countermeasure to this, it is conceivable to provide winding wire retention means for retaining the rotor windings on the salient poles. With regard to this, there is room for improvement in terms of increasing the strength in retaining the rotor windings against centrifugal force that is achieved by the winding wire retention means.

SUMMARY OF THE INVENTION

The invention provides an electromagnetic rotary electric machine, in which the strength in retaining the rotor windings against centrifugal force in an electromagnetic rotary electric machine is increased.

An electromagnetic rotary electric machine in accordance with an aspect of the invention is an electromagnetic rotary electric machine that includes a stator core; teeth disposed at a plurality of locations on the stator core that are spaced from each other in a circumferential direction of the stator; and stator windings of a plurality of phases that are wound on at least the stator core or the teeth and that creates a rotating magnetic field, and a rotor that is disposed facing the stator and that includes: a rotor core; main salient poles disposed at a plurality of locations on the rotor core that are spaced from each other in a circumferential direction of the rotor; a plurality of rotor windings wound around the main salient poles; a magnetic characteristic adjustment portion that causes a magnetic characteristic that occurs in the plurality of main salient poles by induced electromotive forces that are produced in the rotor windings to alternately differ in the circumferential direction of the rotor; and auxiliary salient poles protruded from two opposite side surfaces of each main salient pole in the circumferential direction of the rotor, wherein: in each of rotor slots formed between the main salient poles adjacent to each other in the circumferential direction of the rotor, the auxiliary salient poles adjacent to each other in the circumferential direction of the rotor are connected to each other in the rotor slot; and in each rotor slot, at least a portion of the rotor windings is disposed radially inside the auxiliary salient poles of the rotor.

According to the electromagnetic rotary electric machine in accordance with the invention, it is possible to improve the strength in retaining the rotor windings against centrifugal force.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5B is a diagram corresponding to FIG. 5A, showing another example in which the number of diodes connected to the rotor windings is reduced;

DETAILED DESCRIPTION OF EMBODIMENTS

Figure 1:
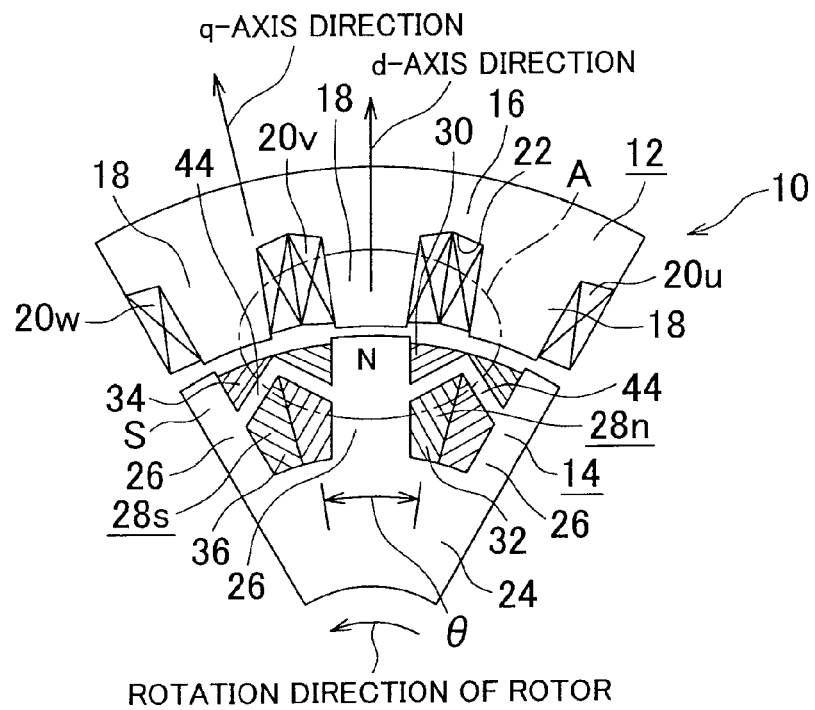
FIG. 1 is a schematic sectional view of portions of a rotor and a stator in the circumferential direction in an electromagnetic rotary electric machine in accordance with an embodiment of the invention.
Figure 2:
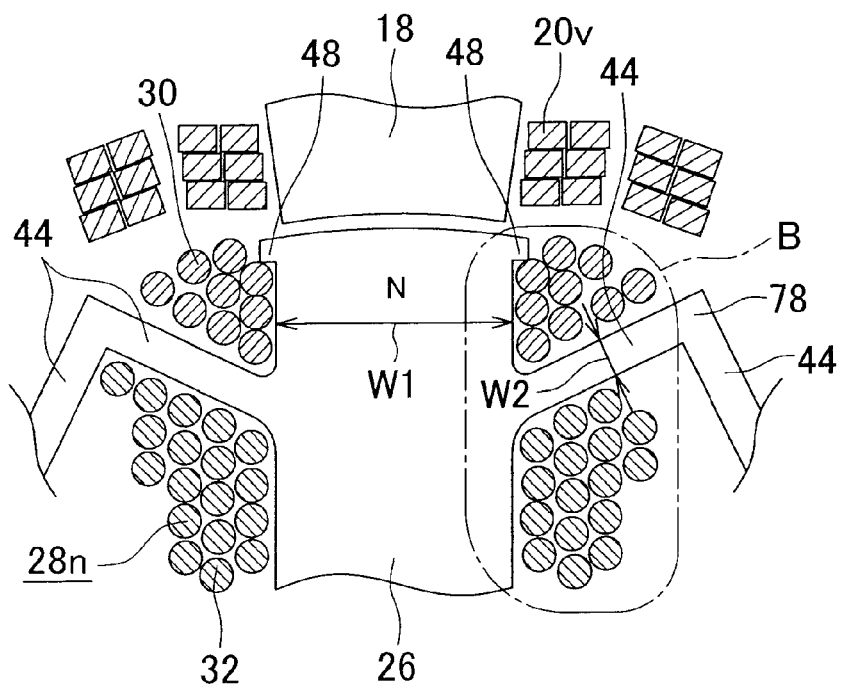
FIG. 2 is an enlarged view of a portion A shown in FIG. 1.
Figure 3:
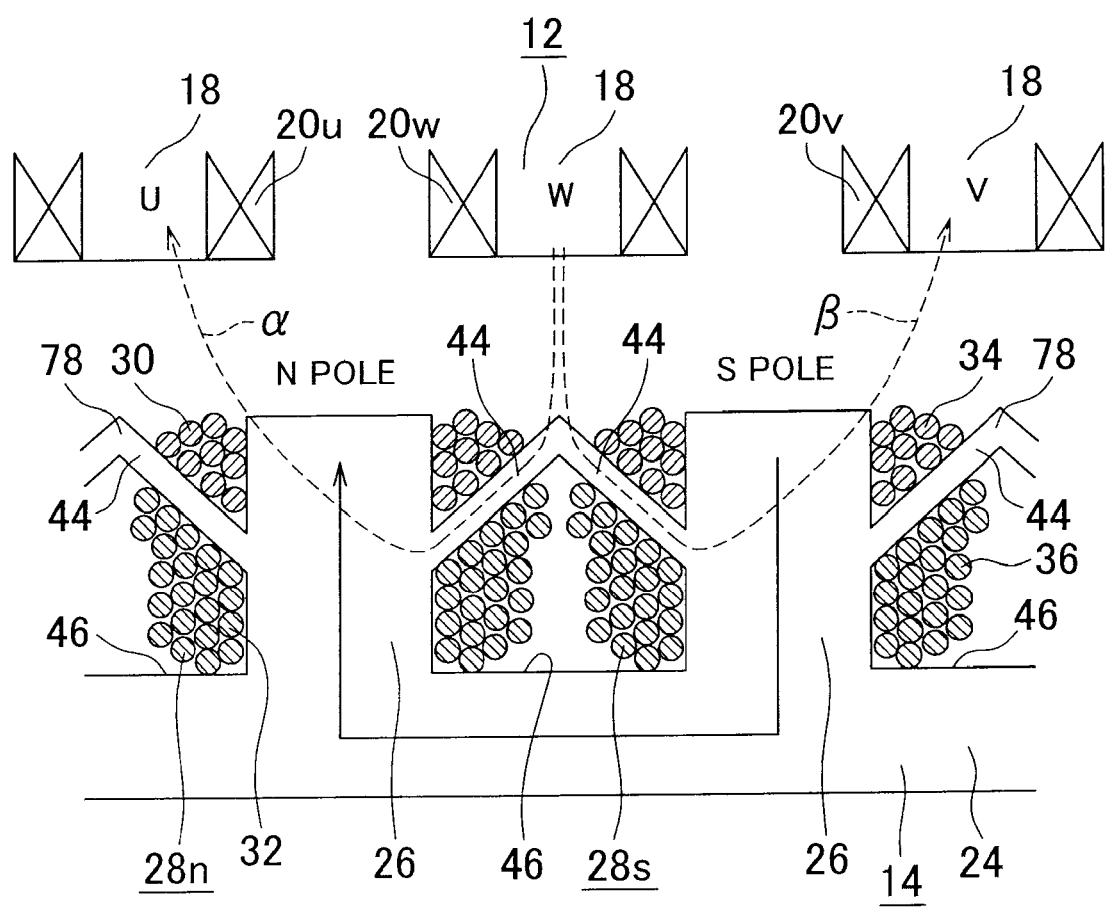
FIG. 3 is a schematic diagram showing how magnetic flux generated by the induced currents that flow in rotor windings flows in the rotor in the embodiment of the invention.
Figure 4:
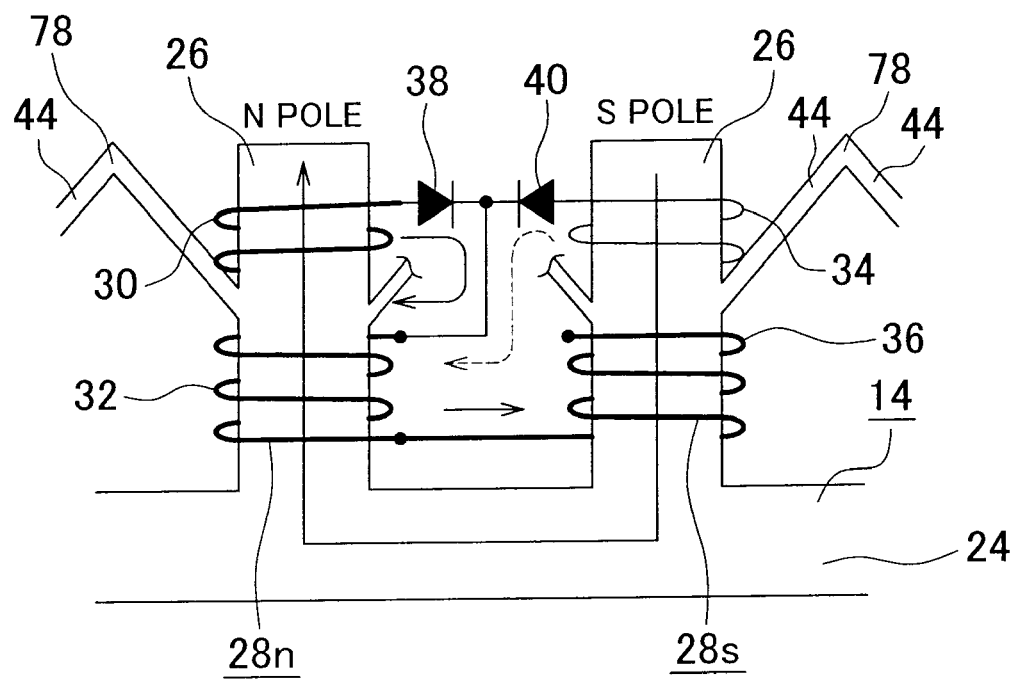
FIG. 4 is a diagram corresponding to FIG. 3 in which diodes are connected to rotor windings.

Hereinafter, embodiments of the invention will be described with reference to the drawings. FIGS. 1 to 7 are diagrams showing an embodiment of the invention. FIG. 1 is a schematic sectional view of portions of a rotor and a stator in the circumferential direction in an electromagnetic rotary electric machine in accordance with the embodiment. FIG. 2 is an enlarged view of a portion A shown in FIG. 1. FIG. 3 is a schematic diagram showing how magnetic flux generated by the induced currents that flow in rotor windings flows in the rotor in the embodiment. FIG. 4 is a diagram corresponding to FIG. 3 in which diodes are connected to rotor windings. As shown in FIG. 1, an electromagnetic rotary electric machine (hereinafter, simply referred to as "rotary electric machine") 10 that functions as an electric motor or an electricity generator includes a stator 12 fixed to a casing (not shown), and a rotor 14 that is disposed radially inside the stator 12 so as to face the stator 12 with a predetermined air gap left therebetween and that is rotatable relative to the stator 12 (the term "radial direction" (that is sometimes indicated by the term radial) refers to any radial direction orthogonal to the rotation center axis of the rotor 14, which applies in the same manner in the entire specification and the claims).

Besides, the stator 12 includes a stator core 16 that functions as a stator yoke, teeth 18 disposed at a plurality of locations on the stator core 16 in a circumferential direction thereof, and stator windings 20u, 20v, and 20w of a plurality of phases (more concretely, three phases, that is, a u-phase, a v-phase, and a w-phase) that are disposed around the individual teeth 18, that is, wound around them. Specifically, on an inner circumferential surface of the stator core 16, the teeth 18 protruded radially inward (toward the rotor 14) are arranged with spaces therebetween in the circumferential direction of the stator 12 and therefore stator slots 22 are formed between the teeth 18. The stator core 16 and the teeth 18 are made of a magnetic material and formed together as an integral body.

The stator windings 20u, 20v, and 20w of the phases are wound around the individual teeth 18 by passing the wires through the stator slots 22 by a short-pitch concentrated winding method. Due to the stator windings 20u, 20v, and 20w being wound on the teeth 18 in the foregoing manner, magnetic poles are constructed. Then, by passing alternating electric currents (AC currents) of plural phases through the stator windings 20u, 20v, and 20w of the plural phases, the teeth 18 disposed at a plurality of positions in the circumferential direction become magnetized, so that a rotating magnetic field that rotates in the circumferential direction is generated in and around the stator 12. That is, the stator windings 20u, 20v, and 20w of the plurality of phases cause the stator 12 to create the rotating magnetic field. Incidentally, the stator windings are not limited to a construction in which windings are wound around the teeth 18 of the stator 12, but can also be wound on the stator core apart from the stator teeth. For example, it is possible to employ a toroidal winding method in which stator windings of a plurality of phases are wound at a plurality of circumferential positions on an annular portion of the stator core 16 that are dislocated from the teeth 18 so as to cause the stator 12 to create a rotating magnetic field.

The rotating magnetic field formed on the teeth 18 and extending from their distal end surfaces acts on the rotor 14. In the example shown in FIG. 1, three teeth 18 around which the three stator windings 20u, 20v, and 20w of the three phases (the u-phase, the v-phase and the w-phase) are wound constitute a pair of poles.

On the other hand, the rotor 14 includes: a hollow cylindrical rotor core 24 that functions as a rotor yoke; main salient poles 26 that are projections protruded radially outward (toward the stator 12) from a plurality of equidistant locations on an outer circumferential surface of the rotor core 24 in the circumferential direction thereof; and a plurality of rotor windings 28n and 28s (incidentally, the term "circumferential direction" (that is sometimes indicated by the term circumferential) refers to any direction along a circle drawn about the rotation center axis of the rotor, which applies in the same manner in the entire specification and the claims). The rotor core 24 and the main salient poles 26 are formed together as an integral body of magnetic members such as a stack of a plurality of magnetic steel plates. More specifically, a plurality of first rotor windings 28n are wound, by the concentrated winding method, around every other main salient pole 26 in the circumferential direction of the rotor 14, and a plurality of second rotor windings 28s are wound, by the concentrated winding method, around the main salient poles 26 that are adjacent to the aforementioned main salient poles 26 provided with the first rotor windings 28n and that are the other set of every other main salient pole 26 in the circumferential direction.

As shown in FIGS. 2 to 4, each first rotor winding 28n includes a first induction winding 30 wound around a distal end-side portion (upper end-side portion in FIGS. 2 to 4) of a main salient pole 26, and a first common winding 32 connected to the first induction winding 30. The first common winding 32 is wound around a base-side portion (lower end-side portion in FIGS. 2 to 4) of the main salient pole 26 around which the first induction winding 30 is wound. Each second rotor winding 28s includes a second induction winding 34 wound around a distal end-side portion of a main salient pole 26 that is circumferentially adjacent to the main salient pole 26 around which the first rotor winding 28n is wound, and a second common winding 36 connected to the second induction winding 34. The second common winding 36 is wound around a base-side portion of the main salient pole 26 around which the second induction winding 34 is wound.

Figure 5A:
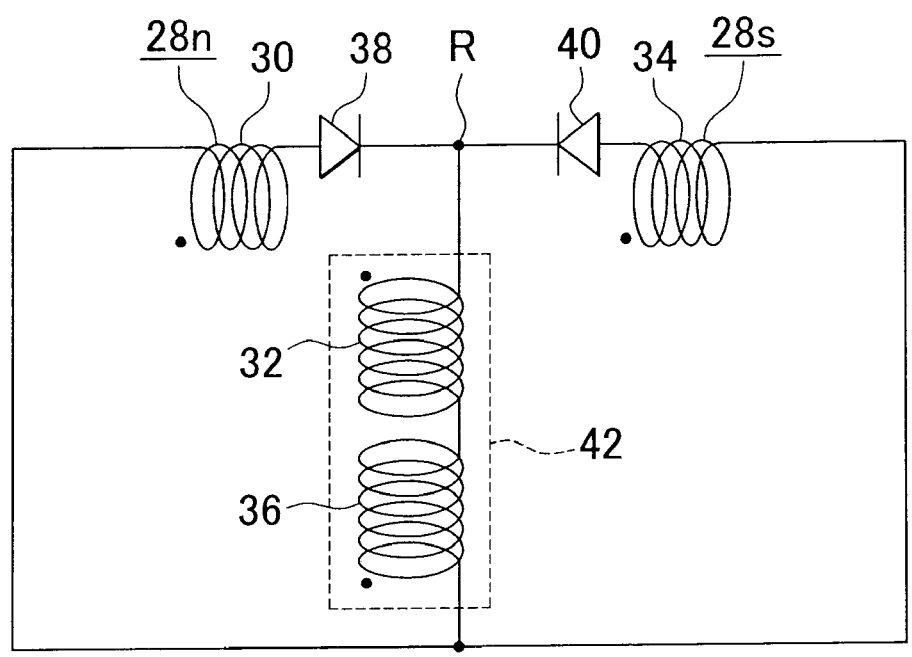
FIG. 5A is a diagram showing an equivalent circuit for a connecting circuit of two rotor windings that are wound around main salient poles adjacent to each other in the circumferential direction of the rotor in the embodiment of the invention.

As shown in FIG. 4, in each set of two main salient poles 26 adjacent to each other in the circumferential direction of the rotor 14, an end of the first induction winding 30 wound around one of the main salient poles 26 and an end of the second induction winding 34 wound around the other main salient pole 26 are connected via two magnetic characteristic adjustment portions that are rectification elements, that is, a first diode 38 and a second diode 40. FIG. 5A is a diagram showing an equivalent circuit for a connecting circuit of two rotor windings 28n and 28s that are wound around main salient poles 26 adjacent to each other in the circumferential direction of the rotor 14 (FIG. 4) in the embodiment. As shown in FIG. 5A, an end of the first induction winding 30 and an end of the second induction winding 34 are connected at a connecting point R via the first diode 38 and the second diode 40 whose forward directions are opposite to each other.

Besides, as shown in FIGS. 4 and 5A, in each of the aforementioned sets, an end of the first common winding 32 wound around one of the two main salient poles 26 is connected to an end of the second common winding 36 wound around the other main salient pole 26. The first common winding 32 and the second common winding 36 are connected to each other in series to form a common winding set 42. Furthermore, the other end of the first common winding 32 is connected to the connecting point R, and the other end of the second common winding 36 is connected to the other ends of the first induction winding 30 and the second induction winding 34 that are opposite to the connecting point R. Besides, winding center axes of the induction windings 30 and 34 and the common windings 32 and 36 of the rotor windings 28n and 28s coincide with radial directions of the rotor 14 (FIG. 1). Incidentally, the induction windings 30 and 34 and the common windings 32 and 36 may also be wound around their corresponding main salient poles 26 with intervention of insulators (not shown) having electrical insulation property that are made of resin or the like.

In this construction, as rectified current flows through the first induction winding 30, the second induction winding 34, the first common winding 32, and the second common winding 36, the main salient poles 26 are magnetized to function as magnetic pole portions, which will be described later. Referring back to FIG. 1, as AC currents are passed through the stator windings 20u, 20v, and 20w, the stator 12 generates a rotating magnetic field. This rotating magnetic field includes not only a magnetic field of a fundamental component but also a magnetic field of a harmonic component that is of higher order than the fundamental component.

More specifically, the distribution of the magnetomotive force that causes the stator 12 to produce the rotating magnetic field does not become a sinusoidal distribution (made up of only the fundamental component), but becomes a distribution that contains harmonic components, due to the arrangement of the stator windings 20u, 20v, and 20w of the phases and the configuration of the stator core 16 based on the teeth 18 and the stator slots 22. In particular, in the case of the concentrated winding method, the stator windings 20u, 20v, and 20w of the three phases do not overlap with each other, so that the amplitude level of the harmonic components that occur in the magnetomotive force distribution of the stator 12 increases. For example, in the case where the stator winding 20u, 20v, and 20w are wound by the three-phase concentrated winding method, a harmonic component that is a temporal third-order component of the input electricity frequency and is a spatial second-order component increases in amplitude level. The harmonic component that occurs in the magnetomotive force due to the arrangement of the stator windings 20u, 20v, and 20w and the configuration of the stator core 16 is termed spatial harmonic.

When a rotating magnetic field that contains a spatial harmonic component is applied from the stator 12 to the rotor 14, the magnetic flex fluctuation of the spatial harmonic produces fluctuation of leakage magnetic flux that leaks into space between the rotor 14 and the main salient poles 26, so that induced electromotive force occurs in at least one of the induction windings 30 and 24 shown in FIG. 3. Besides, it is possible to make the induction windings 30 and 34 at the distal end side of the main salient poles 26, which are relatively close to the stator 12, mainly perform a function of producing induced current, and make the common windings 32 and 36, which are relatively far from the stator 12, mainly perform a function of magnetizing the main salient poles 26. Besides, as can be understood from the equivalent circuit shown in FIG. 5A, the total of the currents that flow through the induction windings 30 and 34 wound around mutually adjacent main salient poles 26 (FIGS. 3 and 4) is the current that flows through each of the common windings 32 and 36. Furthermore, since mutually adjacent common windings 32 and 36 are connected in series, the same effect as is achieved by increasing the numbers of turns on both sides can be achieved, so that it is possible to reduce the current that is passed through the common windings 32 and 36 while the magnetic flux that flows through the main salient poles 26 is kept the same.

When induced electromotive forces occur in the induction windings 30 and 34, direct-current (DC) electric currents according to the rectifying directions of the diodes 38 and 40 flow through the first induction windings 30, the second induction windings 34, the first common windings 32, and the second common windings 36, and the main salient poles 26 around which the rotor windings 28n and 28s are wound are magnetized, so that the main salient poles 26 function as magnetic pole portions that are magnets whose magnetic poles are fixed. In FIG. 4, the winding directions of the first rotor winding 28n and the second rotor winding 28s adjacent to each other in the circumferential direction are opposite to each other, so that the magnetization directions of the main salient poles 26 adjacent to each other in the circumferential direction are opposite to each other. In the example shown in the diagrams, the N pole is produced at the distal end of each main salient pole 26 around which the first rotor winding 28n is wound, and the S pole is produced at the distal end of each main salient pole 26 around which the second rotor winding 28s is wound. Therefore, the N poles and the S poles are arranged alternately with each other in the circumferential direction of the rotor 14. Besides, the diodes 38 and 40 (FIG. 4) cause the magnetic characteristics of the main salient poles 26 produced by the electromotive forces induced in the rotor windings 28n and 28s wound around the main salient poles 26 to differ alternately with each other in the circumferential direction.

Besides, the diodes 38 and 40 are connected to the induction windings 30 and 34, respectively, and rectify the currents that flow in the induction windings 30 and 34, respectively, due to the electromotive forces induced by the rotating magnetic field containing spatial harmonics that is produced by the stator 12, whereby the phases of the electric currents that flow in the induction windings 30 and 34 adjacent to each other in the circumferential direction of the rotor 14 are made different from each other, that is, the A-phase and the B-phase alternate. The A-phase current produces the N pole at the distal end side of each of the corresponding main salient poles 26, and the B-phase current produces the S pole at the distal end side of each of the corresponding main salient poles 26.

Besides, as shown in FIG. 1, the width θ of the induction windings 30 and 34 and the common windings 32 and 36 in the circumferential direction of the rotor 14 is set smaller than a width that corresponds to 180° in the electrical angle of the rotor 14, and the induction windings 30 and 34 and the common windings 32 and 36 are wound around the main salient poles 26 by a short-pitch winding method. More preferably, the width θ of the induction windings 30 and 34 and the common windings 32 and 36 in the circumferential direction of the rotor 14 is equal or substantially equal to a width that corresponds to 90° in the electrical angle of the rotor 14. The width θ of the induction windings 30 and 34 and the common windings 32 and 36 herein can be represented by a center width of sections of the induction windings 30 and 34 and the common windings 32 and 36, taking into account the sectional areas of the induction windings 30 and 34 and the common windings 32 and 36. That is, the width θ of the induction windings 30 and 34 and the common windings 32 and 36 can be represented by an average value of the width of inner circumferential surfaces of the induction windings 30 and 34 and the common windings 32 and 36 and the width of outer circumferential surfaces thereof. Incidentally, the electrical angle of the rotor 14 is represented by a value obtained by multiplying the mechanical angle of the rotor 14 by the number p of pole pairs (electrical angle=mechanical angle× p). Therefore, the width θ of the induction windings 30 and 34 and the common windings 32 and 36 in the circumferential direction satisfies the following expression (1), where r is the distance from the rotation center axis of the rotor 14 to the induction windings 30 and 34 and the common windings 32 and 36.

$$\theta < \pi \times r/p \qquad (1)$$

The reason why the width θ is restricted in this manner will be detailed later.

Particularly, in this embodiment, the rotor 14 includes auxiliary salient poles 44 provided on two circumferentially opposite side surfaces of each of the main salient poles 26 disposed at a plurality of locations in the circumferential direction. Each of the auxiliary salient poles 44 is a platy magnetic body that is protruded from one of the two circumferentially opposite side surfaces of a main salient pole 26 in a direction oblique with respect to the circumferential direction between the first induction winding 30 and the first common winding 32 or between the second induction winding 34 and the second common winding 36 and that extends over substantially the entire length of the main salient pole 26 in the axial direction (a direction perpendicular to the sheet of FIGS. 1 to 2). Therefore, the auxiliary salient poles 44 are protruded from the opposite side surfaces of the main salient poles 26. Besides, two auxiliary salient poles 44 adjacent to each other in the circumferential direction of the rotor 14 in a rotor slot 46 (FIG. 3) formed between two main salient pole 26 circumferentially adjacent to each other are formed integrally together so that distal end portions of the two auxiliary salient poles 44 are connected to each other at a joint portion 78 in the rotor slot 46. The auxiliary salient poles 44, including the joint portions 78, have magnetism. For example, in the example shown in FIGS. 2 and 3, each auxiliary salient pole 44 is joined at its base portion to a radially intermediate portion (intermediate portion in the up-down direction in FIG. 2) of one of the two circumferentially opposite side surfaces of a main salient pole 26, and is protruded therefrom in a direction oblique with respect to the circumferential direction such that the auxiliary salient pole 44 extends radially outward toward the joint portion 78 that is the distal end portion of the auxiliary salient pole 44 and at which the auxiliary salient pole 44 is joined to the circumferentially adjacent auxiliary salient pole 44. Therefore, the joint portion 78 of each auxiliary salient pole 44 that is joined to the adjacent auxiliary salient pole 44 is positioned more outward in the radial direction of the rotor 14 than the base of the adjacent auxiliary salient pole 44. Besides, as can be seen in FIG. 2, the width of the base portion of each auxiliary salient pole 44 is large, and the widths of intermediate to distal end portions thereof are substantially equal widths that are smaller than the width of the base portion. Besides, in each rotor slot 46, the induction windings 30 and 34 are each disposed in a radially outer space partitioned from a radially inner space by the auxiliary salient poles 44, and the common windings 32 and 36 are disposed in the radially inner one of the spaces partitioned by the auxiliary salient poles 44.

Besides, as shown in FIG. 2, a minimum width W2 of each auxiliary salient pole 44 that is a minimum value of the dimension of the auxiliary salient pole 44 in a width direction orthogonal to a longitudinal direction thereof is smaller than a minimum width W1 of each main salient pole 26 that is a minimum value of the dimension of the main salient pole 26 in the circumferential direction of the rotor core 24 (W2<W1).

Besides, as shown in FIG. 3, auxiliary salient poles 44 are protruded from the circumferential side surfaces of mutually adjacent main salient poles 26 that face each other in the circumferential direction. The auxiliary salient poles 44 may be formed of the same magnetic material as the rotor core 24 and the main salient poles 26. For example, the rotor core 24, the main salient poles 26, and the auxiliary salient poles 44 may be integrally formed of a stack that is constructed by stacking a plurality of magnetic steel sheets in the axial direction of the rotor core 24.

Besides, the induction winding 30 or 34 and the common winding 32 or 36 that are wound around one and the same main salient pole 26 are connected at a site apart from the auxiliary salient poles 44, for example, at one or both of the coil end sides (not shown) provided at outer sides of end surfaces of the rotor core 24 in the axial direction. Incidentally, the induction windings 30 and 34 may be formed of one material and the common windings 32 and 36 may be formed of another material. For example, the common windings 32 and 36 may be formed of an electrically conductive material such as a copper wire or the like, and the induction windings 30 and 34 may be formed of another electrically conductive material that is lighter in weight than the electrically conductive material for the common windings, such as aluminum, an aluminum alloy, etc. Besides, as shown in FIG. 2, a distal end portion of each main salient pole 26 may be provided with brim portions 48 that are protruded toward the opposite sides in the circumferential direction so as to prevent the induction windings 30 and 34 (see FIG. 3 or the like for the induction windings 34) from coming off.

Figure 6:
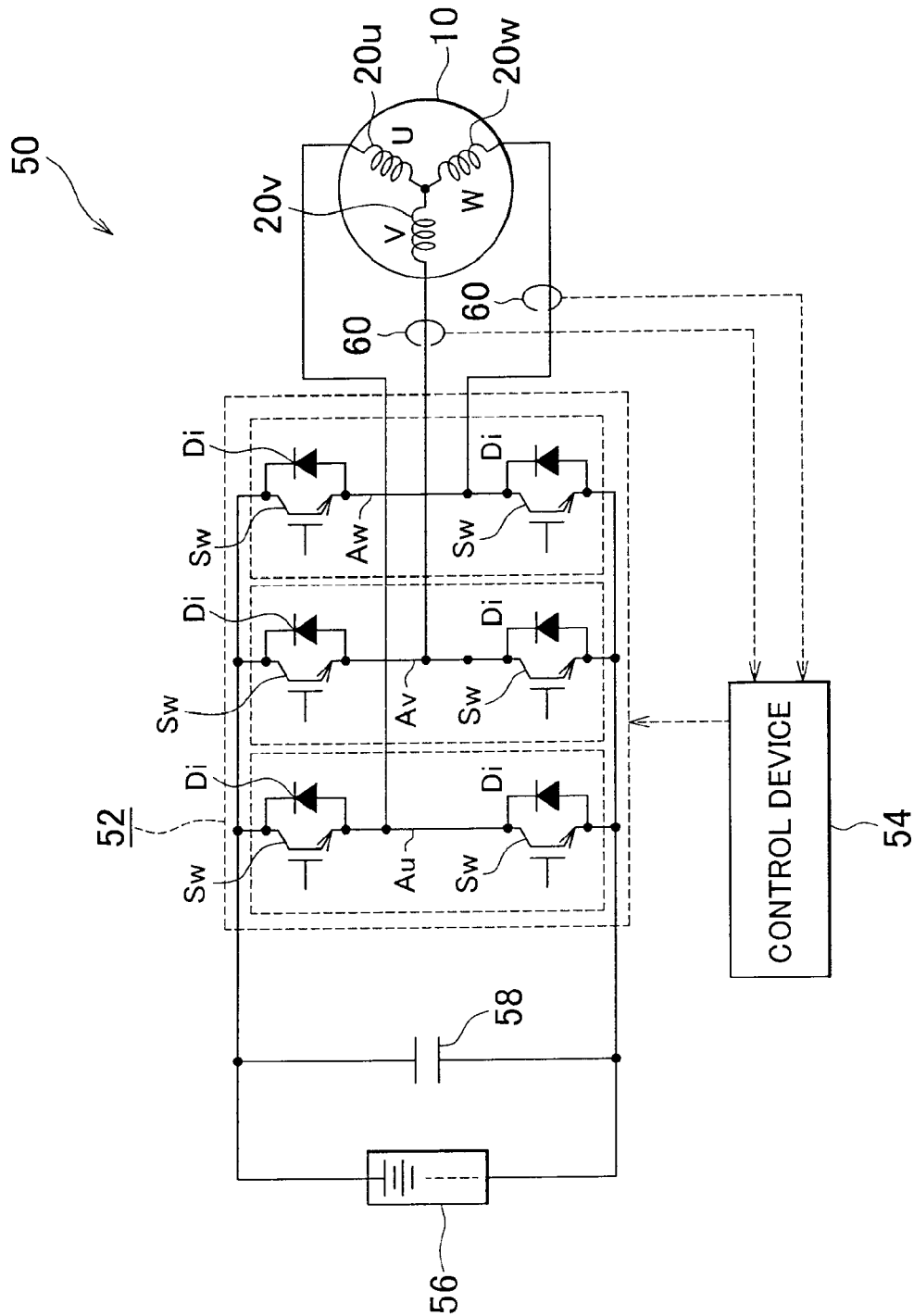
FIG. 6 is a diagram showing a general construction of a rotary electric machine drive system that drives the electromagnetic rotary electric machine shown in FIG. 1.

The rotary electric machine 10 constructed as described above is driven by a rotary electric machine drive system 50 shown in FIG. 6. FIG. 6 is a diagram showing a general construction of the rotary electric machine drive system 50 that drives the rotary electric machine 10 shown in FIG. 1. The rotary electric machine drive system 50 includes the rotary electric machine 10, an inverter 52 that is a drive portion that drives the rotary electric machine 10, a control device 54 that controls the inverter 52, and an electricity storage device 56 that is a power supply portion, and drives the rotary electric machine 10.

The electricity storage device 56 is provided as a DC power supply and rechargeable, and is, for example, a secondary battery. The inverter 52 includes arms Au, Av, and Aw of three phases, that is, a U-phase a V-phase and a W-phase. Each of the arms Au, Av, and Aw of these phases includes two switching elements Sw connected in series. The switching elements Sw are transistors, IGBTs, or the like. A diode Di is connected across each switching element Sw in an inverse parallel manner. A midpoint of each of the arms Au, Av, and Aw is connected to an end of a corresponding phase winding of the stator windings 20u, 20v, and 20w that constitute the rotary electric machine 10. As for the stator windings 20u, 20v, and 20w, the stator windings of each phase are connected in series, and the stator windings 20u, 20v, and 20w of the different phases are connected at a neutral point.

Besides, the positive electrode side and the negative electrode side of the electricity storage device 56 are connected to the positive electrode side and the negative electrode side, respectively, of the inverter 52. A capacitor 58 is connected between the electricity storage device 56 and the inverter 52 so that the capacitor 58 is connected in parallel to the inverter 52. The control device 54 calculates a target torque of the rotary electric machine 10, for example, according to an acceleration command signal input from an accelerator pedal sensor (not shown) of the vehicle or the like, and controls the switching operation of each switching element Sw according to an electric current command value that is commensurate with the target torque or the like. The control device 54 receives input of signals that represent values of current detected by electric current sensors 60 provided for, of the three phases, at least two phase stator windings (e.g., the windings 20u and 20v), and a signal that represents the rotation angle of the rotor 14 (FIG. 1) of the rotary electric machine 10 detected by a rotation angle detection portion (not shown) such as a resolver or the like. The control device 54 includes a microcomputer that has a CPU, a memory, etc., and controls the torque of the rotary electric machine 10 by controlling the switching of the switching elements Sw of the inverter 52. The control device 54 may be constructed of separate control devices, each having a different function.

This control device 54 makes it possible to convert the DC power from the electricity storage device 56 into AC power of three phases, that is, the u-phase, the v-phase and the w-phase, by the switching operations of the switching elements Sw that constitute the inverter 52, thereby supplying electric power of phases that correspond to the phases of the stator windings 20u, 20v, and 20w. The rotary electric machine drive system 50 is mounted for use, for example, as a vehicle traction power generating apparatus in a hybrid vehicle equipped with an engine and a fraction motor as driving power sources, a fuel-cell vehicle, a pure electric vehicle, etc. Incidentally, a DC/DC converter as a voltage conversion portion may be connected between the electricity storage device 56 and the inverter 52 so that the voltage of the electricity storage device 56 can be stepped up and then supplied to the inverter 52.

In the above-described rotary electric machine 10, as the rotating magnetic field (fundamental component) formed by the teeth 18 of the stator 12 by passing three-phase AC currents through the three-phase stator windings 20u, 20v, and 20w acts on the rotor 14, the main salient poles 26 of the rotor 14 are accordingly attracted to the rotating magnetic field of the teeth 18 so that the magnetic resistance of the rotor 14 lessens. Due to this, torque (reluctance torque) acts on the rotor 14.

Furthermore, when the rotating magnetic field having spatial harmonic components that is formed around the teeth 18 of the stator 12 links the induction windings 30 and 34 of the rotor windings 28n and 28s of the rotor 14, magnetic flux fluctuation of a frequency different from the rotation frequency of the rotor 14 (the fundamental component of the rotating magnetic field) resulting from the spatial harmonic components produces induced electromotive forces in the induction windings 30 and 34 of the rotor windings 28n and 28s. The currents that flow in the rotor windings 28n and 28s due to the production of the induced electromotive force are rectified into one-direction currents (DC currents) by the diodes 38 and 40, respectively. Then, the main salient poles 26 are magnetized as the direct electric currents rectified by the diodes 38 and 40 flow through the rotor windings 28n and 28s, respectively, so that the main salient poles 26 function as magnets whose magnetic poles are fixed (to either the N pole or the S pole).

For example, the case where, as shown in FIG. 3, the teeth 18 of the stator 12 around which the stator windings 20u, 20v, and 20w are wound do not radially face the main salient poles 26 around which the rotor windings 28n and 28s are wound but each tooth 18 faces a middle point between two main salient poles 26 adjacent to each other in the circumferential direction of the rotor 14 will be considered. Besides, the case where q-axis magnetic flux that is magnetic flux of a spatial second harmonic, as magnetomotive force of the stator 12, flows from the stator 12 to the rotor 14 as shown by interrupted line arrows in FIG. 3 will be considered. In this case, due to the presence of the auxiliary salient poles 44, the spatial harmonics are guided in large amount from the teeth 18 (of the W phase in FIG. 3) of the stator 12 to the adjacent main salient poles 26 through the auxiliary salient poles 44, and are guided from the main salient poles 26 to other teeth 18 (of the U-phase and the V-phase in FIG. 3), so that a large amount of magnetic flux can be caused to link the induction windings 30 and 34. FIG. 3 shows a state that corresponds to the phase angle at which a maximum amount of magnetic flux of the q-axis magnetic flux flows from one tooth 18. During one electrical cycle, the direction and the magnitude of the q-axis magnetic flux change. Besides, in FIG. 3, an interrupted line arrow α shows magnetic flux that links the induction winding 30, and an interrupted line arrow β shows magnetic flux that links the induction winding 34. In this case, a second diode 40 (FIG. 4) is connected to the second induction winding 34 wound around a main salient pole 26 that becomes the S pole, and the second diode 40 allows current to flow in such a direction as to cause the corresponding main salient pole 26 to be the S pole. Therefore, a magnetic flux tends to flow through the S pole-side main salient pole 26 in such a direction as to change the S pole into the N pole due to the q-axis magnetic flux, and an induced current tends to flow in the second induction winding 34 in such a direction as to prevent the flow of the magnetic flux, and the flow of the induced current is not prevented by the second diode 40. As a result, as shown by a solid line arrow in FIG. 3, a magnetic flux caused by the induced current flows through the main salient pole 26. Besides, there also is a case where the q-axis magnetic flux tends to flow from teeth 18 of the stator 12 into auxiliary salient poles 44 via the main salient poles 26 that are the N poles. In that case, when magnetic flux tends to flow in such a direction as to change the N-pole main salient poles 26 into the S poles, induced current tends to flow in the first induction windings 30 wound around the N-pole main salient poles 26 in such a flowing direction as to prevent the flow of the magnetic flux. In this case, the first diode 38 (FIG. 4) connected to the first induction winding 30 allows current to flow in such a direction as to change the corresponding main salient pole 26 into the N pole. In this case, too, magnetic flux caused by the induced current flows through the main salient pole 26 as shown by the solid line arrow in FIG. 3. Therefore, each main salient pole 26 is magnetized to the N pole or the S pole. Since the auxiliary salient poles 44 are protruded from the two opposite side surfaces of each main salient pole 26 as described above, it is possible to increase the maximum value of the amplitude of the magnetic flux that links the induction windings 30 and 34 and it is therefore possible to increase the change in the magnetic flux linkage, in comparison with the case where no auxiliary salient pole 44 is provided, that is, where only space exists in the slot 46 between main salient poles 26 adjacent to each other in the circumferential direction.

Then, the magnetic fields of the main salient poles 26 (magnets whose magnetic poles are fixed) interact with the rotating magnetic field (fundamental component) generated by the stator 12, so that the attracting and repelling action occurs. The electromagnetic interaction (attracting and repelling action) between the rotating magnetic field (fundamental component) generated by the stator 12 and the magnetic fields of the main salient poles 26 (magnets) also produces torque (torque that corresponds to the magnet torque) in the rotor 14, so that the rotor 14 is rotated synchronously with the rotating magnetic field (fundamental component) generated by the stator 12. Thus, the rotary electric machine 10 can function as an electric motor that causes the rotor 14 to produce power (mechanical power) by using the electric power supplied to the stator windings 20*u*, 20*v*, and 20*w*.

Besides, since the induced current that flows in the first induction winding 30 and the induced current that flows in the second induction winding 34 are out-of-phase with each other, half wave rectified currents that are out-of-phase with each other are produced in the first induction winding 30 and the second induction winding 34. On the other hand, through the first common winding 32 and the second common winding 36, there flows a current equal to the sum of the current that flows through the first induction winding 30 and the current that flows through the second induction winding 34, so that, for example, a continuous and large DC current flows. This facilitates formation of magnetic poles in the main salient poles 26, so that it is possible to increase the torque of the rotor 14.

Furthermore, according to the rotary electric machine 10 of this embodiment, the rotor 14 includes the auxiliary salient poles 44 protruded from the two side surfaces of each main salient pole 26 that are opposite in the circumferential direction of the rotor 14, and the two circumferentially adjacent auxiliary salient poles 44 in each of the rotor slots 46 formed between main salient poles 26 adjacent to each other in the circumferential direction of the rotor 14 are connected in the rotor slot 46. Besides, at the radially inner side of the auxiliary salient poles 44 in each rotor slot 46, the first common winding 32 and the second common winding 36 each of which is part of a corresponding one of the rotor windings 28*n* and 28*s* are disposed. Therefore, it is possible to improve the strength in retaining the rotor windings 28*n* and 28*s* against centrifugal force. Specifically, in the case where circumferentially adjacent auxiliary salient poles are separate from each in a rotor slot 46 unlike the embodiment, if the strength of the auxiliary salient poles is small, it cannot be said that there is no possibility that due to the centrifugal force during rotation of the rotor 14, the common windings 32 and 36 may push the auxiliary salient poles radially outward and thus may be displaced radially outward. In the embodiment, however, since the auxiliary salient poles 44 in each rotor slot 46 are connected to each other, the aforementioned inconvenience can be eliminated, and the strength in retaining the rotor windings 28*n* and 28*s* can be improved. Besides, it becomes unnecessary to provide fixture portions for the rotor windings 28*n* and 28*s* at locations apart from the auxiliary salient poles 44.

Besides, since the auxiliary salient poles 44 have magnetism, the spatial harmonic that is contained in the rotating magnetic field generate by the stator 12 and that is a harmonic component that links the rotor windings 28*n* and 28*s*, for example, a spatial second, that is, temporal third, harmonic component, can be effectively increased by the auxiliary salient poles 44. For example, much magnetic flux of harmonic components according to a distribution of magnetomotive force produced by the stator 12 can be guided from the teeth 18 of the stator 12 to the main salient poles 26 through the auxiliary salient poles 44 so that a large amount of magnetic flux link the rotor windings 28*n* and 28*s*. Besides, a large amount of magnetic flux of harmonic components can also be guided from the teeth 18 to the auxiliary salient poles 44 through the main salient poles 26 so that a large amount of magnetic flux link the rotor windings 28*n* and 28*s*. Therefore, the change in the magnetic flux density of the magnetic flux that links the rotor windings 28*n* and 28*s* can be made large, and the current induced in the rotor windings 28*n* and 28*s* can be made large, and therefore the magnetic force produced by the magnetic poles of electromagnets formed in the main salient poles 26 can be strengthened. Therefore, it is possible to increase the rotor magnetic force, so that it is possible to increase the torque of the rotary electric machine 10 without increasing the size of the rotary electric machine 10. Besides, since a desired torque can be obtained even if the stator current that is passed through the stator windings 20*u*, 20*v*, and 20*w* is lessened, it is possible to reduce the copper loss and improve efficiency. As a result, it is possible to increase the torque and efficiency of the rotary electric machine 10. Thus, since magnetic paths are formed because the auxiliary salient poles 44 made of a magnetic material are protruded directly from the circumferentially opposite side surfaces of the main salient poles 26 and the auxiliary salient poles 44 and the main salient poles 26 are magnetically directly connected together, it is possible to increase the magnetic flux that links the rotor windings 28*n* and 28*s*, and it is possible to increase the torque and efficiency of the rotary electric machine 10.

In contrast, in the case where unlike the embodiment, no auxiliary salient pole 44 that has magnetism is formed on either one of the circumferential side surfaces of any main salient pole 26, the amount of magnetic flux linkage for inducing current in the rotor windings 28*n* and 28*s* lessens, and the induced current produced in the rotor windings 28*n* and 28*s* becomes smaller. Therefore, the magnetic force of the electromagnets formed by the induced current flowing through the rotor windings 28*n* and 28*s* weakens. Thus, there is room for improvement to increase the torque of the rotary electric machine 10. Besides, in order to obtain a desired torque in this construction, it is necessary to cause large stator current to flow through the stator windings 20*u*, 20*v*, and 20*w*, which increases the copper loss of the stator windings 20*u*, 20*v*, and 20*w* and thus may cause reduced efficiency. According to this embodiment, however, it is possible to eliminate all the foregoing difficulties and increase the torque and efficiency of the rotary electric machine 10.

Besides, since the joint portion 78 of each auxiliary salient pole 44 that connects to the circumferentially adjacent auxiliary salient pole 44 is positioned more outward in the radial direction of the rotor 14 than the base portions of the auxiliary salient poles 44, necessary magnetic flux components of the spatial harmonics are efficiently guided from the auxiliary salient poles 44 to the main salient poles 26 according to the position of the joint portion 78 of each auxiliary salient pole 22 so that a large amount of magnetic flux efficiently links the rotor windings 28n and 28s. Thus, it is possible to effectively increase the torque and efficiency of the rotary electric machine 10.

Besides, each auxiliary salient pole 44 is protruded from a circumferential side surface of a main salient pole 26 in a direction oblique with respect to the circumferential direction such that the auxiliary salient pole 44 extends radially outward toward the joint portion 78. Therefore, it is possible to efficiently guide necessary magnetic flux components of spatial harmonics, for example, a high-magnetic flux density spatial second harmonic component, from the auxiliary salient poles 44 to the main salient poles 26 so that a large amount of magnetic flux efficiently links the rotor windings 28n and 28s, without excessively increasing the length of each auxiliary salient pole 44. Thus, it is possible to more effectively increase the torque and efficiency of the rotary electric machine 10.

Besides, the minimum width W2 that is the minimum value of the dimension of each auxiliary salient pole 44 in the width direction orthogonal to the direction of the length thereof is smaller than the minimum width W1 that is the dimension of each main salient pole 26 in the circumferential direction. Due to this, the amount of magnetic flux linkage for inducing current in the rotor windings 28n and 28s is properly restricted, and it is possible to restrain the magnetic saturation of the main salient poles 26 that form electromagnets, so that it is possible to increase the torque and prevent the increase in the iron loss. Specifically, if the minimum width W2 of the auxiliary salient poles 44 is greater than the width W1 of the main salient poles 26 unlike the embodiment, the amount of magnetic flux that links the induction windings 30 and 34 for producing induced current, for example, becomes excessively large in amount on the distal end side in the case where the minimum width W1 of each main salient pole 26 is provided at the distal end side of the bases of the auxiliary salient poles 44. In that case, the auxiliary salient poles 44 are likely to be magnetically saturated, and there is possibility of decline in the torque of the rotary electric machine and decline in efficiency due to increased iron loss. On the other hand, in the embodiment, since the amount of magnetic flux that links the induction windings 30 and 34 is properly restricted, it is possible to increase the torque and efficiency of the rotary electric machine 10.

Rotor winding 28n and 28s include induction windings 30 and 34 and common windings 32 and 36 connected to the induction windings 30 and 34, respectively. In each rotor slot 46, the induction windings 30 and 34 are each disposed in a radially outer one of radially inner and outer spaces partitioned by the auxiliary salient poles 44, and the common windings 32 and 36 are disposed in the radially inner one of the radially inner and outer spaces partitioned by the auxiliary salient poles 44. Therefore, a large amount of fluctuating magnetic flux links only the induction windings 30 and 34, among the induction windings 30 and 34 and the common windings 32 and 36, so that it is possible to increase the currents induced in the induction windings 30 and 34. Therefore, it is possible to effectively accomplish the function of producing induced currents mainly in the induction windings 30 and 34 while reducing the number of turns of each of the induction windings 30 and 34, and it is also possible to increase the number of turns of each of the common windings 32 and 36 and therefore effectively accomplish the function of causing the common windings 32 and 36 to magnetize mainly the main salient poles 26. Therefore, the formation of electromagnets in the main salient poles 26 is facilitated, and it is possible to increase the torque of the rotary electric machine 10.

Figure 7:
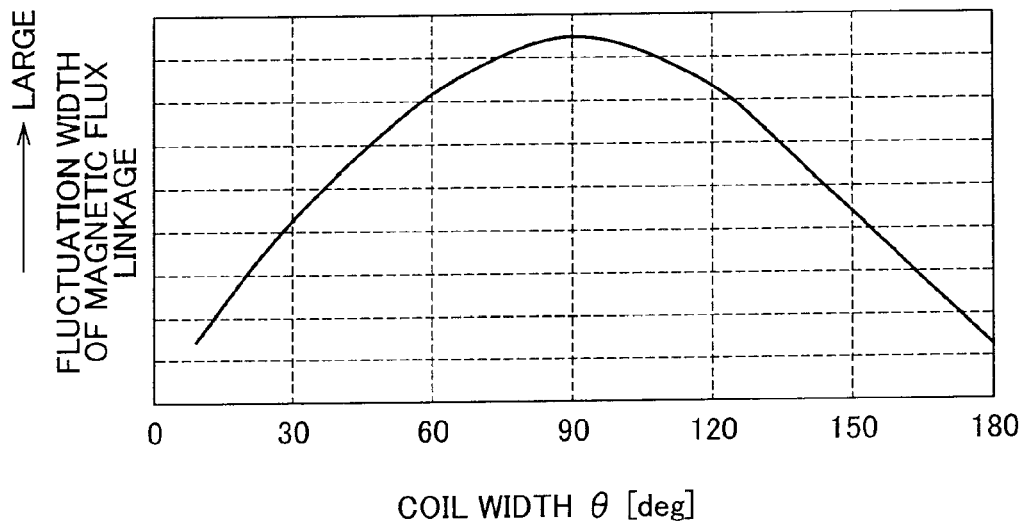
FIG. 7 is a diagram showing results of calculating the amplitude of the magnetic flux that links the rotor windings in the electromagnetic rotary electric machine shown in FIG. 1 while the width of the rotor windings in the circumferential direction is being changed.

In the embodiment, with regard to the rotor windings 28n and 28s, the width θ thereof in the circumferential direction of the rotor 14 is restricted as stated in relation to the expression (1) above. Therefore, it is possible to increase the induced electromotive forces produced in the rotor windings 28n and 28s by the spatial harmonics of the rotating magnetic field. Specifically, the amplitude (fluctuation width) of the magnetic flux linkage for the rotor windings 28n and 28s that is caused by the spatial harmonics is affected by the width θ of the rotor windings 28n and 28s in the circumferential direction. FIG. 7 shows results of calculating the amplitude (fluctuation width) of the magnetic flux linkage for the rotor windings 28n and 28s while changing the width θ of the rotor windings 28n and 28s in the circumferential direction. In FIG. 7, the coil width θ shown has been converted into electrical angle. As shown in FIG. 7, as the coil width θ decreases from 180°, the fluctuation width of the magnetic flux linkage for the rotor windings 28n and 28s increases. Therefore, by making the coil width θ smaller than 180°, that is, by winding the rotor windings 28n and 28s by the short-pitch winding method, the amplitude of the magnetic flux linkage that is caused by the spatial harmonics is increased in comparison with the case where the rotor windings 28n and 28s are wound by a full-pitch winding method.

Hence, in the rotary electric machine 10 (FIG. 1), by making the width of the main salient poles 26 in the circumferential direction smaller than the width that corresponds to 180° in the electrical angle and by winding the rotor windings 28n and 28s around the main salient poles 26 by the short-pitch winding method, the induced electromotive force produced in the rotor windings 28n and 28s by the spatial harmonics is efficiently increased. As a result, it is possible to efficiently increase the torque that acts on the rotor 14.

Furthermore, as shown in FIG. 7, the amplitude of the magnetic flux linkage that results from the spatial harmonics becomes maximum when the coil width θ is 90°. Hence, in order to further increase the amplitude of the magnetic flux linkage for the rotor windings 28n and 28s that results from the spatial harmonics, it is preferable that the width θ of each of the rotor windings 28n and 28s in the circumferential direction be equal (or substantially equal) to the width that corresponds to 90° in the electrical angle of the rotor 14. Therefore, it is preferable that the width θ of the rotor windings 28n and 28s in the circumferential direction satisfies (or substantially satisfies) the following expression (2), where p is the number of pole pairs of the rotor 14 and r is the distance from the rotation center axis of the rotor 14 to the rotor windings 28n and 28s.

$$\theta = \pi \times r/(2 \times p) \qquad (2)$$

This maximizes the induced electromotive force that is produced in the rotor windings 28n and 28s by the spatial harmonics, and therefore most efficiently increases the magnetic flux produced in each main salient pole 26 by the induced currents. As a result, it is possible to more efficiently increase the torque that acts on the rotor 14. Specifically, if the width θ greatly exceeds the width that corresponds to 90°, the magnetomotive forces in such directions as to cancel out each other become likely to link the rotor windings 28n and 28s. On the other hand, as the width θ decreases from the width that corresponds to 90°, the likelihood of the linkage decreases. However, if the width θ becomes greatly smaller than the width that corresponds to 90°, the amount of magnetic flux that links the rotor windings 28n and 28s greatly reduces. Therefore, such a disadvantage is prevented by setting the width θ at a width that corresponds to about 90°. Therefore, it is preferable that the width θ of each of the rotor windings 28n and 28s in the circumferential direction be substantially equal to the width that corresponds to 90° in the electrical angle.

Besides, in the rotary electric machine 10, it is also possible to control the torque of the rotor 14 by controlling the electric current lead angle relative to the rotor position, that is, by controlling the phases of the AC currents that are passed through the stator windings 20u, 20v, and 20w. Furthermore, it is also possible to control the torque of the rotor 14 by controlling the amplitude of the AC currents passed through the stator windings 20u, 20v, and 20w. Besides, since changing the rotation speed of the rotor 14 also changes the torque of the rotor 14, it is also possible to control the torque of the rotor 14 by controlling the rotation speed of the rotor 14.

Figure 8:
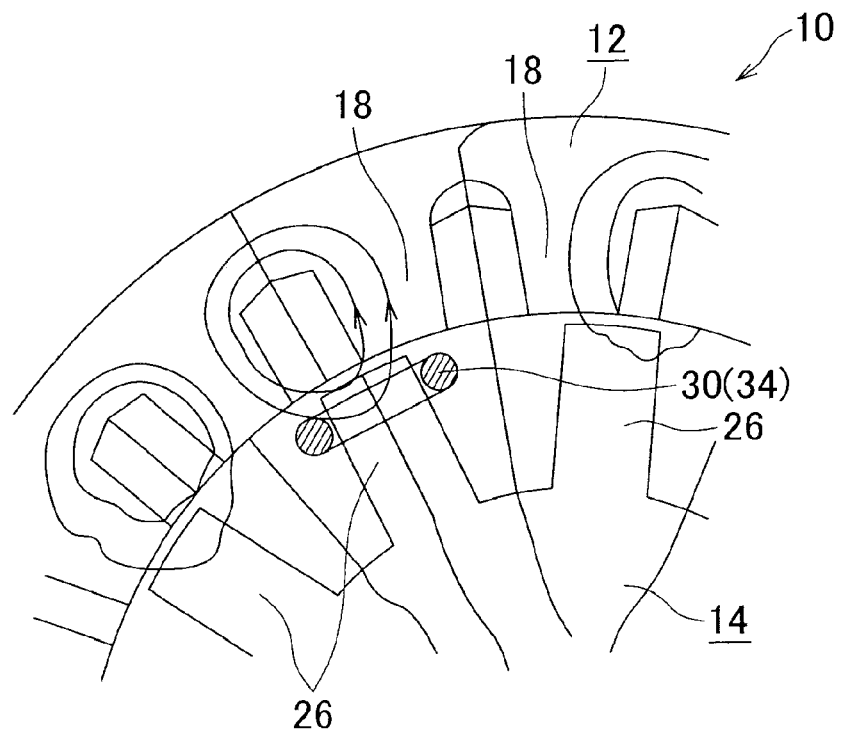
FIG. 8 is a diagram showing magnetic flux lines that induce rotor electric currents in results of simulations with an electromagnetic rotary electric machine of a comparative example.
Figure 9:
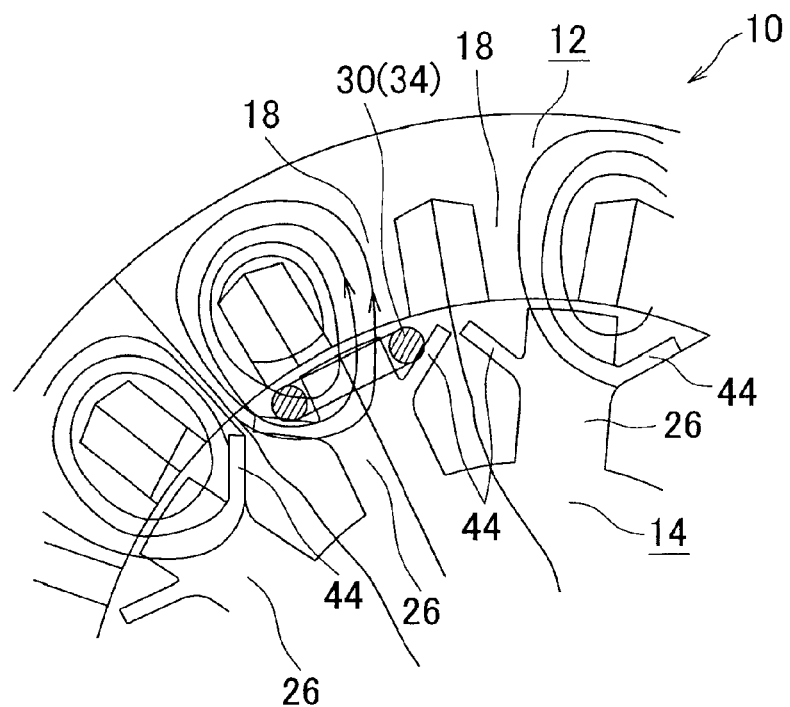
FIG. 9 is a diagram showing magnetic flux lines that induce rotor electric currents in results of simulations with the electromagnetic rotary electric machine in accordance with the embodiment of the invention.

Next, with reference to FIGS. 8 and 9, results of simulations with regard to the magnetic flux lines of spatial harmonics of rotary electric machines of the embodiment and a comparative example will be described. FIGS. 8 and 9 show schematic diagrams showing magnetic flux lines of spatial harmonics. FIG. 8 shows the case of the comparative example, and FIG. 9 shows the case of the embodiment described above with reference to FIGS. 1 to 5. The comparative example shown in FIG. 8 has a construction obtained by omitting the auxiliary salient pole 44 from the rotary electric machine 10 of the embodiment shown in FIGS. 1 to 5. The phase relations between the rotor 14 and the stator 12 shown in FIGS. 8 and 9 are the same. In the cases shown in FIGS. 8 and 9, circumferential portions of teeth 18 of the stator 12 and circumferential portions of main salient poles 26 of the rotor 14 face each other in the radial directions.

As is apparent from the simulation results, in the embodiment shown in FIG. 9 in which the auxiliary salient poles 44 are provided, more magnetic flux lines of spatial harmonics link the induction windings 30 and 34 while passing through the auxiliary salient poles 44 than in the comparative example shown in FIG. 8 that is not provided with any auxiliary salient pole 44. Note that the construction shown in FIG. 9 is for investigating the influence of the auxiliary salient poles on the distribution of the magnetic flux by simulation and therefore, in this construction, the adjacent auxiliary salient poles are not connected to each other. However, the distribution of the magnetic flux in the case of the construction, in which the adjacent auxiliary salient poles are connected to each other is similar to that shown in FIG. 9.

Incidentally, in the embodiment described above with reference to FIGS. 1 to 7, the auxiliary salient poles 44 have magnetism. However, the auxiliary salient poles 44 may also be formed of a non-magnetic material or a substantially non-magnetic material, such as a titanium alloy or the like. Also in this case, it is possible to improve the strength in retaining the rotor windings 28n and 28s against centrifugal force.

Incidentally, in the above-described construction shown in FIGS. 4 and 5B, in each set of two main salient poles 2 adjacent to each other in the circumferential direction of the rotor 14, an end of the first induction winding 30 wound around one of the two main salient poles 26 and an end of the second induction winding 34 wound around the other main salient pole 26 are connected via the first diode 38 and the second diode 40, that is, two rectification elements. However, this embodiment may also be constructed as shown in FIG. 5B. FIG. 5B is a diagram corresponding to FIG. 5A, showing another example in which the number of diodes connected to the rotor windings is reduced. In the example of the embodiment shown in FIG. 5B, a first induction winding set 86 is formed by connecting in series the first induction windings 30 wound around the distal end-side portion of each of the main salient poles 26 that become the N poles of the rotor (see FIG. 3) and that are a set of circumferentially every other main salient pole 26, and a second induction winding set 88 is formed by connecting in series the second induction windings 34 wound around the distal end-side portion of each of the main salient poles 26 that become the S poles of the rotor and that are the other set of circumferentially every other main salient pole 26. An end of the first induction winding set 86 and an end of the second induction winding set 88 are connected at a connecting point R via a first diode 38 and a second diode 40 whose forward directions are opposite to each other.

Besides, as shown in FIG. 5B, in each of sets of two main salient poles 26 (see FIG. 3) adjacent to each other in the circumferential direction, which are the N pole and the S pole, a common winding set 42 is formed by connecting in series the first common winding 32 wound around one of the two main salient poles 26 and the second common winding 36 wound around the other main salient pole 26. Furthermore, all the common winding sets 42 (corresponding to all the main salient poles 26) are connected in series. Furthermore, an end of the first common winding 32 of an end one of the common winding sets 42 connected in series is connected to the connecting point R, and an end of the second common winding 36 of the other end one of the common winding sets 42 connected in series is connected to an end of the first induction winding set 86 and an end of the second induction winding set 88 that are opposite to the connecting point R. In this construction, it is possible to reduce the total number of diodes provided for the rotor to two, that is, one first diode 38 and one second diode 40, unlike the above-described construction shown FIGS. 4 and 5A. Also in the construction shown in FIG. 5B, auxiliary salient poles 44 (see FIG. 3) may be formed on side surfaces of each main salient pole 26, and the induction windings 30 and 34 and the common windings 32 and 36 may be disposed in the radially outer spaces and the radially inner spaces, respectively, that are partitioned by the auxiliary salient poles 44.

Figure 10:
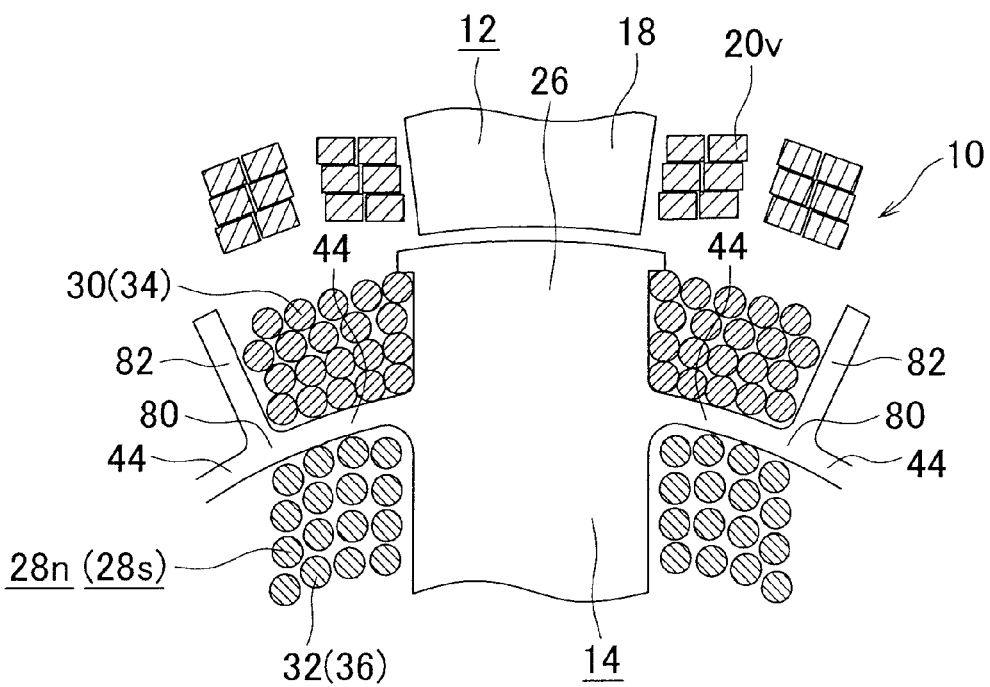
FIG. 10 is a diagram corresponding to FIG. 2, showing a first one of other examples of auxiliary salient poles in an electromagnetic rotary electric machine in accordance with another embodiment of the invention.

FIG. 10 is a diagram corresponding to FIG. 2, showing a first one of other examples of auxiliary salient poles 44. In the construction shown in FIG. 10, auxiliary salient poles 44 are protruded from two circumferentially opposite side surfaces of each main salient pole 26, and auxiliary salient poles 44 adjacent to each other in the circumferential direction are connected by a connection portion 80. The rotor 14 further includes radial salient poles 82 that are protruded radially outward from the connection portions 80 and that have magnetism.

In the construction shown in FIG. 10, it is possible to increase the total sectional area of the induction windings 30 (34) disposed at the radially outer side of the auxiliary salient poles 44, unlike the construction shown in FIG. 2. Therefore, it becomes easier to dispose many rotor windings 28n (28s) at the outer side of the auxiliary salient poles 44 in the radial directions of the rotor 14. Other constructions and effects are the same as those of the above-described embodiment shown in FIGS. 1 to 7.

Figure 11:
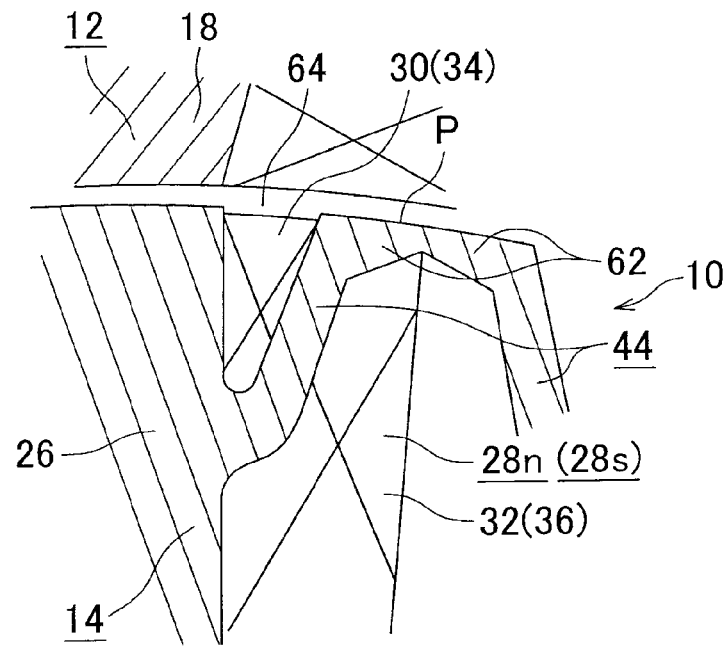
FIG. 11 is a diagram showing a portion B in FIG. 2, showing a second one of the other examples of auxiliary salient poles in an electromagnetic rotary electric machine in accordance with another embodiment of the invention.

FIG. 11 is an enlarged view corresponding to the portion B in FIG. 2, showing a second one of the other examples of auxiliary salient poles 44 in a rotary electric machine in accordance with another embodiment of the invention. In the construction shown in FIG. 11, a distal end portion of each auxiliary salient pole 44 is provided with a widened distal end portion 62 whose width in the circumferential direction increases toward the distal end of the auxiliary salient pole 44 in the construction of the above-described embodiment shown in FIGS. 1 to 7. That is, each auxiliary salient pole 44 has a widened distal end portion 62 whose circumferential width increases toward an outer side in the radial direction of the rotor 14. Besides, auxiliary salient poles 44 adjacent to each other in the circumferential direction are joined at distal end portions of their widened distal end portions 62. A distal end surface P of each widened distal end portion 62 that faces the stator 12 is a curved surface that extends in the direction of a circumference of an annular gap space 64 between the stator 12 and the rotor 14, or is a flat surface that touches the curved surface. According to this construction, a necessary magnetic flux component of the spatial harmonics from the stator 12, for example, a spatial second harmonic component, is efficiently guided to the main salient poles 26 through the auxiliary salient poles 44, without a need to increase the circumferential width of each auxiliary salient pole 44 over the entire length thereof. Therefore, a necessary magnetic flux component of the spatial harmonics from the stator 12 is efficiently guided to the main salient poles 26 or the auxiliary salient poles 44 through the auxiliary salient poles 44 or the main salient poles 26 so that a large amount of magnetic flux efficiently links the rotor windings 28n (28s), without excessively reducing the size of the spaces in which the rotor windings 28n (28s) are disposed. As a result, it is possible to effectively increase the torque and efficiency of the rotary electric machine 10. Other constructions and effects are the same as in the above-described embodiment shown in FIGS. 1 to 7.

Figure 12:
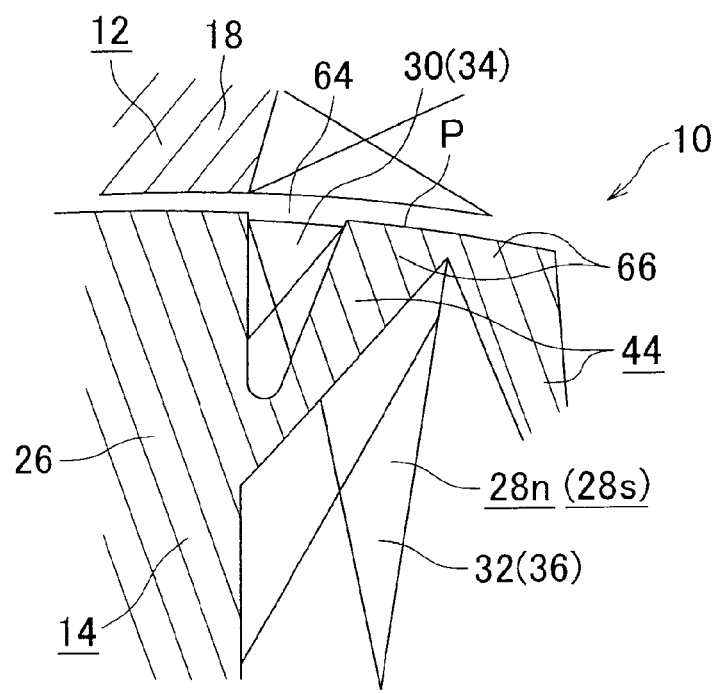
FIG. 12 is a diagram showing a portion B in FIG. 2, showing a third one of the other examples of auxiliary salient poles in an electromagnetic rotary electric machine in accordance with another embodiment of the invention.

FIG. 12 is an enlarged view corresponding to the portion B in FIG. 2, showing a third one of the other examples of auxiliary salient poles 44 in a rotary electric machine in accordance with another embodiment of the invention. In the construction shown in FIG. 12, the width of each auxiliary salient pole 44 in the circumferential direction is increased, not only in the distal end portion of the auxiliary salient pole 44 but also in an intermediate portion thereof. Specifically, the circumferential width of each auxiliary salient pole gradually increases from a base portion toward the distal end thereof. Besides, a distal end portion of each auxiliary salient pole 44 is provided with a widened distal end portion 66 whose circumferential width increases toward the outer side in the radial direction of the rotor 14. Also in this construction, as in the case of the construction shown in FIG. 11 as described above, without excessively reducing the size of the spaces in which the rotor windings 28n (28s) are disposed, a necessary magnetic flux component of the spatial harmonics from the stator 12 is efficiently guided to the main salient poles 26 or the auxiliary salient poles 44 through the auxiliary salient poles 44 or the main salient poles 26, so that it is possible to effectively increase the torque and efficiency of the rotary electric machine 10. Other constructions and effects are the same as those of the above-described embodiment shown in FIGS. 1 to 7 or the construction shown in FIG. 11.

Figure 13:
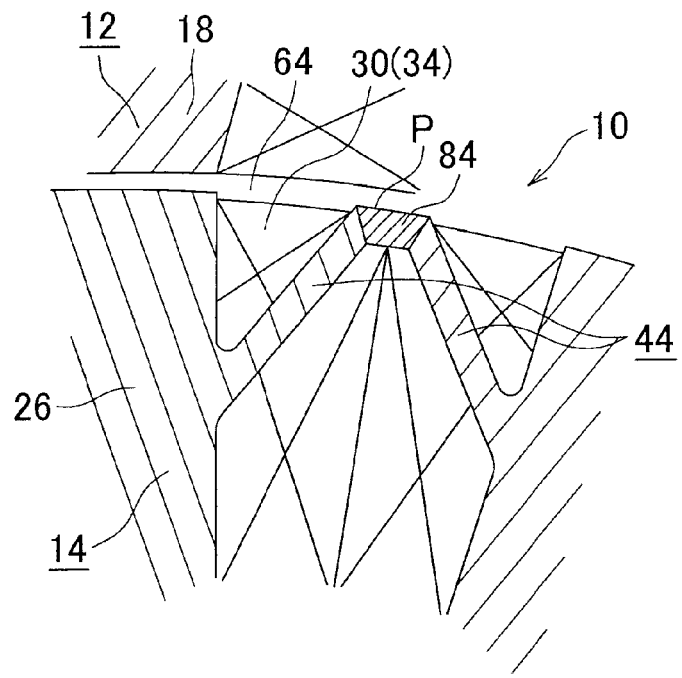
FIG. 13 is a diagram showing a portion B in FIG. 2, showing a fourth one of the other examples of auxiliary salient poles in an electromagnetic rotary electric machine in accordance with another embodiment of the invention.

FIG. 13 is an enlarged view corresponding to the portion B in FIG. 2, showing a fourth one of the other examples of auxiliary salient poles 44 in a rotary electric machine in accordance with another embodiment of the invention. In the construction shown in FIG. 13, distal end portions of auxiliary salient poles 44 adjacent to each other in the circumferential direction are joined via a platy non-magnetic joint portion 84. The non-magnetic joint portions 84 are formed of a non-magnetic material or a substantially non-magnetic material, such as a titanium alloy or the like. The non-magnetic joint portions 84 extend in the axial direction (direction perpendicular to the sheet of FIG. 13) along the distal end portions of the auxiliary salient poles 44. Therefore, in each rotor slot 46 (see FIG. 3), the two auxiliary salient poles 44 adjacent to each other in the circumferential direction are joined via the non-magnetic joint portion 84. According to this construction, the magnetic flux that does not contribute to torque is restrained from flowing in the main salient poles 26, so that it is possible to effectively increase torque. Specifically, in the above-described embodiment shown in FIGS. 1 to 7, adjacent magnetic auxiliary salient poles 44 are directly connected integrally together. In this construction, there is a possibility of formation of a magnetic circuit in which magnetic flux flows from portions of the rotor core 24 (see FIG. 3) that are apart from the main salient poles 26, the main salient poles 26 that become the N poles, the auxiliary salient poles 44 joined to those main salient poles 26, the other auxiliary salient poles 44 joined to the aforementioned auxiliary salient poles 44, the main salient poles 26 that become S poles and to which the other auxiliary salient poles 44 are joined, and the rotor core 24 in this order, and thus makes a loop. In this case, the loop magnetic circuit does not contribute to torque. Besides, corresponding to the flow of magnetic flux in the loop magnetic circuit, magnetic flux saturation of the main salient pole 26 becomes more likely to occur; therefore, there is room for improvement in terms of effective prevention of reduction of the magnetic flux that contributes to torque. According to the construction shown in FIG. 13, it is possible to achieve improvements in the aforementioned respects, and it is possible to more effectively increase the torque. Other constructions and effects are the same as those of the above-described embodiment shown in FIGS. 1 to 7.

Figure 14:
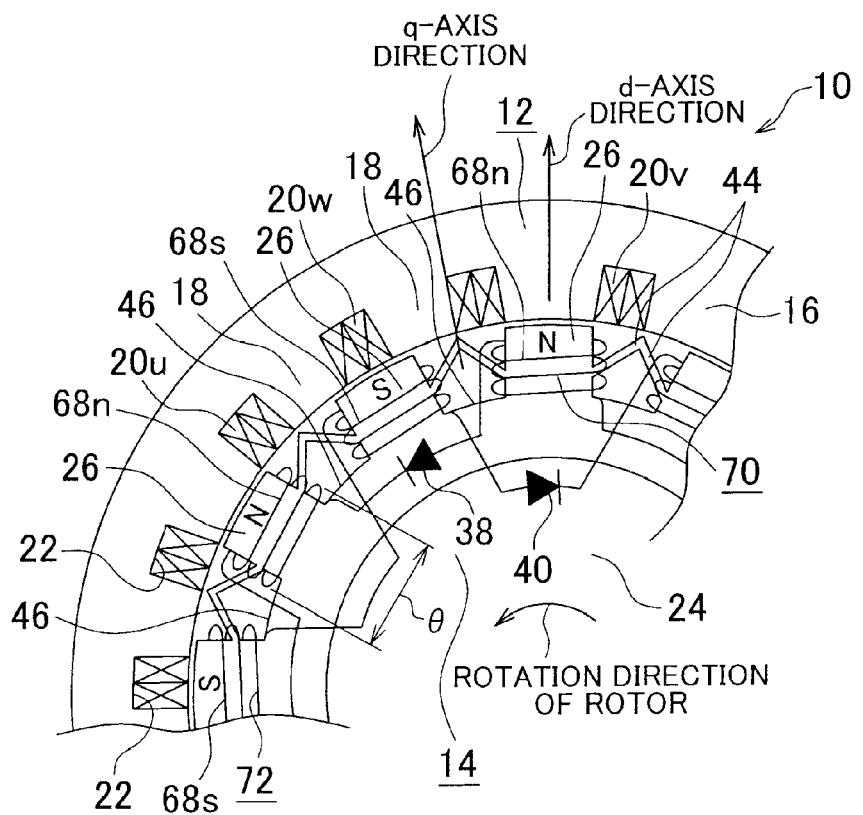
FIG. 14 is a schematic sectional view of portions of a rotor and a stator in the circumferential direction in an electromagnetic rotary electric machine in accordance with another embodiment of the invention.
Figure 15:
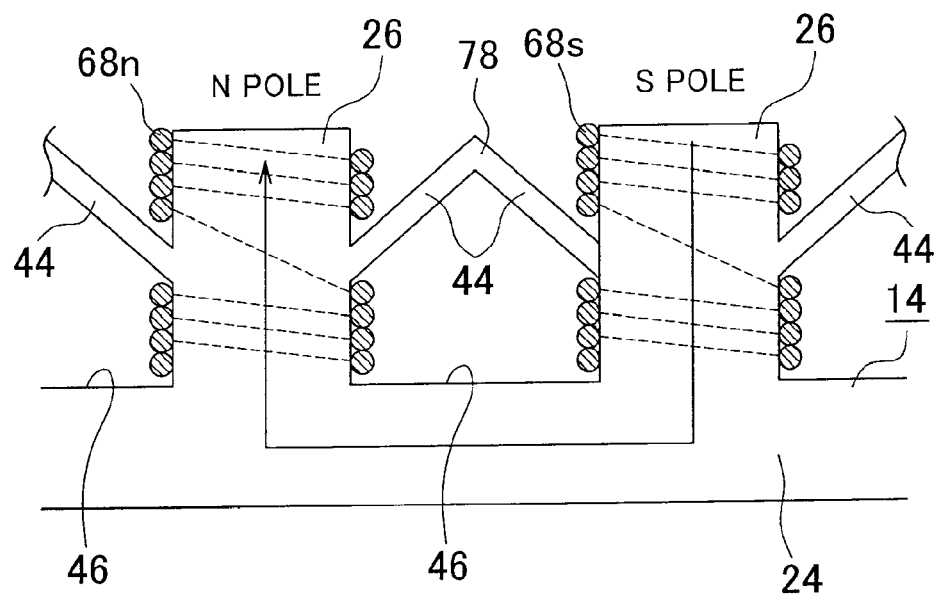
FIG. 15 is a schematic diagram showing how magnetic flux generated by the induced currents that flow in rotor windings flows in the rotor in the electromagnetic rotary electric machine shown in FIG. 14.

FIG. 14 is a schematic sectional view of portions of a rotor 14 and a stator 12 in the circumferential direction in an electromagnetic rotary electric machine in accordance with another embodiment of the invention. FIG. 15 is a schematic diagram showing how magnetic flux generated by the induced currents that flow in rotor windings 68n and 68s flows in the rotor 14 in the electromagnetic rotary electric machine shown in FIG. 14. In the construction shown in FIGS. 14 and 15, a rotor winding 68n (68s) wound around each main salient pole 26 is separated from another rotor winding 68s (68n) that is wound around another main salient pole 26 that is adjacent to the former main salient pole 26. Specifically, on the rotor 14, a plurality of first rotor windings 68n are wound around every other one of the main salient poles 26 in the circumferential direction by the concentrated winding method, and a plurality of second rotor windings 68s are wound, by the concentrated winding method, around the main salient poles 26 that are adjacent to the main salient poles 26 around which the first rotor windings 68n are wound and that are the other set of every other one of the main salient poles 26 in the circumferential direction.

Besides, one first diode 38 is connected to a first rotor winding circuit 70 that is formed by connecting the first rotor windings 68n in series, and one second diode 40 is connected to a second rotor winding circuit 72 that is formed by connecting the second rotor windings 68s in series. Specifically, the plurality of first rotor windings 68n disposed on every other main salient pole 26 in the circumferential direction are electrically connected in series, and are connected in an endless form, and the first diode 38 is connected in series between two adjacent first rotor windings 68n. In this manner, the first rotor winding circuit 70 is constructed. The first rotor windings 68n are wound around the main salient poles 26 that function as the same magnetic pole (the N pole).

The plurality of second rotor windings 68s are electrically connected in series, and are connected in an endless form, and the second diode 40 is connected in series between two adjacent second rotor windings 68s. In this manner, the second rotor winding circuit 72 is constructed. The second rotor windings 68s are wound around the main salient poles 26 that function as the same magnetic pole (the S pole). Besides, the rotor windings 68n and 68s wound around main salient poles 26 adjacent to each other in the circumferential direction (which form magnets of different magnetic poles) are electrically separated from each other.

Besides, the rectifying directions of the currents in the rotor winding 68n and 68s by the first and second diodes 38 and 40 are opposite to each other so that main salient poles 26 adjacent to each other in the circumferential direction of the rotor 14 form different magnetic poles. Specifically, the diodes 38 and 40 are connected to the rotor windings 68n and 68s, respectively, so that the directions in which currents flow through the first rotor windings 68n and the second rotor windings 68s that are disposed adjacent to each other in the circumferential direction (the rectifying directions of the diodes 38 and 40), that is, the forward directions of the diodes, are opposite to each other. The diodes 38 and 40 are connected to the rotor windings 68n and 68s, respectively, in directions opposite to each other.

Besides, as the diodes 38 and 40 rectify the currents that flow in the rotor windings 68n and 68s, respectively, due to the electromotive forces induced by the rotating magnetic field containing spatial harmonics that is generated by the stator 12, the phases of the currents that flow in the rotor windings 68n and 68s adjacent to each other in the circumferential direction of the rotor 14 are made different from each other, that is, the A-phase and the B-phase alternate. The diodes 38 and 40 each independently rectify the currents induced to flow in the rotor windings 68n and 68s, respectively, due to the induced electromotive forces, so that the magnetic characteristics of the main salient poles 26 disposed at a plurality of locations in the circumferential direction that are effected by the currents that flow in the rotor windings 68n and through the rotor windings 68s vary alternately in the circumferential direction. In this construction, the total number of diodes 38 and 40 is reduced to two, and therefore the structure of the windings of the rotor 14 is simplified.

Furthermore, auxiliary salient poles 44 are protruded from the two circumferentially opposite side surfaces of each main salient pole 26, and the auxiliary salient poles 44 adjacent to each other in the circumferential direction in each rotor slot 46 are connected together. Besides, while the rotor windings 68n and 68s wound around the main salient poles 26 are separated into the distal end-side portion and the base-side portion by the auxiliary salient poles 44, the distal end-side portion and the base-side portion of the rotor windings 68n and 68s are connected in series. Incidentally, although in the example shown in FIGS. 14 and 15, each auxiliary salient pole 44 is protruded from a circumferential side surface of a main salient pole 26 in a direction oblique with respect to the circumferential direction, it is also possible to adopt a construction as shown in FIG. 10 in which the auxiliary salient poles 44 are protruded in the circumferential directions from the circumferentially opposite side surfaces of the main salient poles 26, and in which a radial salient pole 82 is protruded from the connection portion 80 between the two circumferentially adjacent auxiliary salient poles 44 provided between two adjacent main salient poles 26. It is also possible to increase the width of the distal end portion of each auxiliary salient pole 44 in the circumferential direction as in the construction shown in FIGS. 11 and 12. Also in the construction shown in FIGS. 14 and 15, it is possible to improve the strength in retaining the rotor windings 68n and 68s against centrifugal force. Other constructions and effects are the same as those of the above-described embodiment shown in FIGS. 1 to 7.

Figure 16:
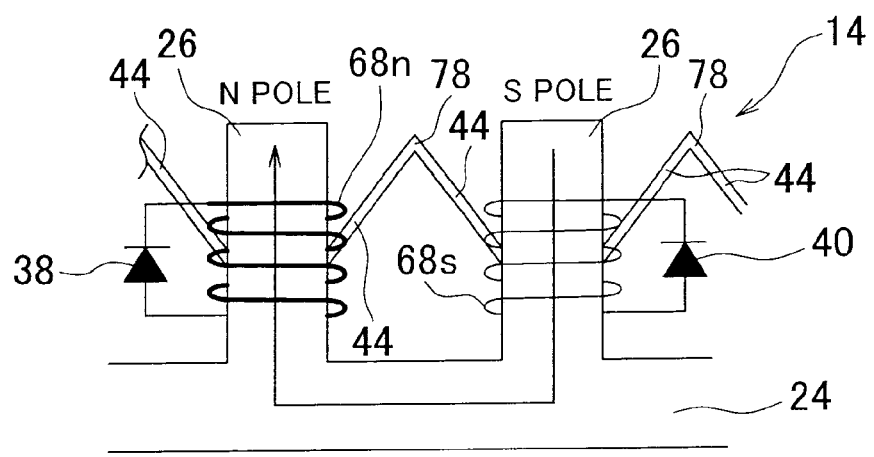
FIG. 16 is a schematic diagram showing how magnetic flux generated by the induced currents that flow in rotor windings flows in an electromagnetic rotary electric machine in accordance with another embodiment of the invention.

Furthermore, it is also possible to adopt a construction as shown in FIG. 16 in which each of the rotor windings 68n and 68s wound around the main salient poles 26 is provided with one first or second diode 38 or 40 so as to form a short circuit. Other constructions and effects are the same as those of the above-described embodiment shown in FIGS. 1 to 7 or the above-described embodiment shown in FIGS. 14 and 15.

Incidentally, although not shown in the drawings, in the rotary electric machine drive system 50 shown in FIG. 6, it is possible to further increase the torque of the rotary electric machine 10 by periodically superposing pulse current on the q-axis current or the d-axis current of the rotary electric machine 10. In the case where pulse current is superposed on the q-axis current, it is preferable to superpose a decrease pulse current that decreases in a pulse manner before increasing, in terms of reducing the size of the inverter 52. In the case where pulse current is superposed on the d-axis current, it is preferable to superpose an increase pulse current that increases in a pulse manner before decreasing, in terms of increasing the torque. It is also possible to superpose the increase pulse current on the d-axis current simultaneously with superposing the decrease pulse current on the q-axis current. Incidentally, the d-axis refers to magnetic pole directions that are winding center axis directions of the rotor windings 28n and 28s (or 68n and 68s) in terms of the circumferential directions of the rotary electric machine 10, and the q-axis refers to directions that are advanced from the d-axis by 90° in the electric angle. For example, in the case where the rotation direction of the rotor 14 is specified as shown in FIG. 1 or 14, d-axis directions and q-axis directions are specified in a relation as shown in FIG. 1 or FIG. 14.

While forms for carrying out the invention have been described above, needless to say, the invention is not limited to these embodiments at all, but can be carried out in various forms without departing from the gist of the invention. For example, although the forgoing description has been made in conjunction with the construction where the rotor is disposed facing the radially inner side of the stator, the invention can also be carried out in a construction in which a rotor is disposed facing a radially outer side of a stator. Besides, while the foregoing description has been made in conjunction with the constructions in which the stator windings are wound on the stator by the concentrated winding method, the invention can also be carried out in a construction in which stator windings are wound on the stator by, for example, a distributed winding method, as long as a rotating magnetic field that contains a spatial harmonic is generated. Besides, although the foregoing embodiments have been described in conjunction with the constructions in which the magnetic characteristic adjustment portion is diodes, any other construction may be adopted as long as the construction provides a function of circumferentially varying the magnetic characteristics effected in the main salient poles by the induced electromotive forces produced in the rotor windings. Besides, in the invention, it is possible to adopt a construction of, for example, an axial gap type rotary electric machine or the like.

The auxiliary salient poles may have magnetism.

According to the foregoing construction, it is possible to increase harmonic components that are contained in the rotating magnetic field generated by the stator and that link the rotor windings. Therefore, it is possible to increase changes in the magnetic flux density of the magnetic flux that links the rotor windings and to increase the induced currents that are induced in the rotor windings.

The rotor windings may be connected to a rectification element that is a magnetic characteristic adjustment portion, and the rectification element may cause the phases of electric currents that flow through the rotor windings adjacent to each other in the circumferential direction of the rotor to be different from each other so that the A-phase and the B-phase alternate, by rectifying the electric currents that flow in the rotor windings due to production of the induced electromotive forces.

A joint portion, at which one of the auxiliary salient poles is joined to another adjacent one of the auxiliary salient poles, may be located outwardly relative to a base of the auxiliary salient pole in the radial direction of the rotor.

According to this construction, necessary magnetic flux components of the spatial harmonics are efficiently guided from the auxiliary salient poles to the main salient poles according to the position of the joint portion, at which one of the auxiliary salient poles is joined to another adjacent one of the auxiliary salient poles, so that a large amount of magnetic flux efficiently links the rotor windings and thus the currents induced in the rotor windings increase.

Each auxiliary salient pole may be protruded from a side surface of one of the main salient poles in the circumferential direction of the rotor in a direction oblique with respect to the circumferential direction of the rotor such that that the auxiliary salient pole extends outward in the radial direction of the rotor toward the joint portion.

According to the foregoing construction, it is possible to efficiently guide necessary magnetic flux components of spatial harmonics from the auxiliary salient poles to the main salient poles so that a large amount of magnetic flux efficiently links the rotor windings and thus the currents induced in the rotor windings increase.

Each auxiliary salient pole may be protruded in the circumferential direction of the rotor from a side surface of a main salient pole in the circumferential direction of the rotor so that the auxiliary salient poles adjacent to each other are connected to each other at a connection portion, and the rotor may further include radial salient poles each of which is protruded radially outward from the connection portion and has magnetism.

According to the foregoing construction, it becomes easier to dispose many rotor windings outwardly relative to the auxiliary salient poles in the radial direction of the rotor.

Each auxiliary salient pole may have a distal end portion whose width in the circumferential direction of the rotor increases toward an outer side in the radial direction of the rotor.

According to the forgoing construction, a necessary magnetic flux component of the spatial harmonics is efficiently guided to the main salient poles or the auxiliary salient poles from the auxiliary salient poles or the main salient poles so that a large amount of magnetic flux efficiently links the rotor windings and the electric current induced in the rotor windings increase, without excessively reducing the size of the spaces in which the rotor windings are disposed.

A minimum value of a dimension of each auxiliary salient pole along a width direction orthogonal to a longitudinal direction of the auxiliary salient pole may be smaller than a minimum value of a dimension of each main salient pole along the circumferential direction of the rotor.

According to the foregoing construction, the magnetic flux linkage for inducing electric current in the rotor windings is properly restricted, and the magnetic saturation of the main salient poles that form electromagnets is restrained so that it is possible to increase the torque and prevent the increase in the iron loss. Therefore, it is possible to increase the torque and efficiency.

The auxiliary salient poles adjacent to each other in the circumferential direction of the rotor in each rotor slot may be joined together via a non-magnetic joint portion that is made of a non-magnetic material.

According to the foregoing construction, the magnetic flux that does not contribute to torque is restrained from flowing in the main salient poles, and it is possible to more effectively increase torque.

The rotor windings may include induction windings and common windings connected to the induction windings, and the induction windings may be disposed in radially outer spaces partitioned from radially inner spaces by the auxiliary salient poles in the rotor slots, and the common windings may be disposed in the radially inner spaces partitioned from the radially outer spaces by the auxiliary salient poles in the rotor slots.

According to the foregoing construction, a large amount of fluctuating magnetic flux links only the induction windings, among the induction windings and the common windings, so that the currents induced in the induction windings are increased. Therefore, it is possible to cause the induction windings to effectively perform the function of producing induced currents in the induction windings while reducing the number of turns of each of the induction windings, and it is also possible to increase the number of turns of each of the common windings and therefore cause the common windings to effectively perform the function of magnetizing the main salient poles. Therefore, the formation of electromagnets in the main salient poles is facilitated, and it is possible to increase the torque of the rotary electric machine.

The rotor windings may include first induction windings that are the induction windings each of which is wound around a distal end-side portion of a main salient pole of one group of every other one of the main salient poles in the circumferential direction of the rotor, second induction windings that are the induction windings each of which is wound around the distal end-side portion of one of other main salient poles adjacent to the main salient poles around which the first induction windings are wound, first common windings that are the common windings each of which is wound around a base-side portion of one of the main salient poles around which the first induction windings are wound, and second common windings that are the common windings each of which is wound around the base-side portion of one of the main salient poles around which the second induction windings are wound, and the first induction windings and the second induction windings may be connected at a connecting point via respective rectification elements that are the magnetic characteristic adjustment portions and whose forward directions are opposite to each other, and a common winding set formed by connecting the first common windings and the second common windings in series may be connected at an end of the common winding set to the connecting point, and may be connected at another end of the common winding set to the first induction windings and to the second induction windings.

A width of each rotor winding in the circumferential direction of the rotor may be shorter than a width that corresponds to 180° in electrical angle.

The width of each rotor winding in the circumferential direction of the rotor may be equal to a width that corresponds to 90° in electrical angle.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. An electromagnetic rotary electric machine comprising a stator that includes:
 a stator core;
 teeth disposed at a plurality of locations on the stator core that are spaced from each other in a circumferential direction of the stator; and
 stator windings of a plurality of phases that are wound on at least the stator core or the teeth and that creates a rotating magnetic field, and
a rotor that is disposed facing the stator and that includes:
 a rotor core;
 main salient poles disposed at a plurality of locations on the rotor core that are spaced from each other in a circumferential direction of the rotor;
 a plurality of rotor windings wound around the main salient poles;
 a magnetic characteristic adjustment portion that causes a magnetic characteristic that occurs in the plurality of main salient poles by induced electromotive forces that are produced in the rotor windings to alternately differ in the circumferential direction of the rotor; and
 auxiliary salient poles protruded from two opposite side surfaces of each main salient pole in the circumferential direction of the rotor, the auxiliary poles each having a joint portion, and each of the auxiliary poles and each of the joint portions including a magnetic body having magnetism, wherein:
in each of rotor slots formed between the main salient poles adjacent to each other in the circumferential direction of the rotor, the auxiliary salient poles adjacent to each other in the circumferential direction of the rotor are connected to each other by the joint portions in the rotor slot; and
in each rotor slot, each of the rotor windings includes a common winding that is wound around one of the main salient poles and disposed radially inside the auxiliary salient poles of the rotor and an induction winding that is wound around the same one of the main salient poles as the common winding, and is immediately connected to the common winding, wherein the induction winding is disposed radially outside the auxiliary salient poles.

2. The electromagnetic rotary electric machine according to claim 1, wherein
the auxiliary salient poles have magnetism.

3. The electromagnetic rotary electric machine according to claim 1, wherein:
the rotor windings are connected to a rectification element that is the magnetic characteristic adjustment portion; and
the rectification element causes phases of electric currents that flow in the rotor windings adjacent to each other in the circumferential direction of the rotor to be different from each other so that an A-phase and a B-phase alternate, by rectifying the electric currents that flow in the rotor windings due to production of the induced electromotive forces.

4. The electromagnetic rotary electric machine according to claim 1, wherein
a joint portion, at which one of the auxiliary salient poles is joined to another adjacent one of the auxiliary salient poles, is located outwardly relative to a base of the auxiliary salient pole in the radial direction of the rotor.

5. The electromagnetic rotary electric machine according to claim 4, wherein
each auxiliary salient pole is protruded from a side surface of one of the main salient poles in the circumferential direction of the rotor in a direction oblique with respect to the circumferential direction of the rotor such that the auxiliary salient pole extends outward in the radial direction of the rotor toward the joint portion.

6. The electromagnetic rotary electric machine according to claim 4, wherein
each auxiliary salient pole has a distal end portion whose width in the circumferential direction of the rotor increases toward an outer side in the radial direction of the rotor.

7. The electromagnetic rotary electric machine according to claim 1, wherein:
each auxiliary salient pole is protruded in the circumferential direction of the rotor from a side surface of a main salient pole in the circumferential direction of the rotor so that auxiliary salient poles adjacent to each other are connected to each other at a connection portion; and
the rotor further includes radial salient poles each of which is protruded radially outward from the connection portion and has magnetism.

8. The electromagnetic rotary electric machine according to claim 1, wherein
a minimum value of a dimension of each auxiliary salient pole along a width direction orthogonal to a longitudinal direction of the auxiliary salient pole is smaller than a minimum value of a dimension of each main salient pole along the circumferential direction of the rotor.

9. The electromagnetic rotary electric machine according to claim 1, wherein
the auxiliary salient poles adjacent to each other in the circumferential direction of the rotor in each rotor slot are joined together via a non-magnetic joint portion that is made of a non-magnetic material.

10. The electromagnetic rotary electric machine according to claim 1, wherein:
the rotor windings include induction windings and common windings connected to the induction windings;
the induction windings are disposed in radially outer spaces partitioned from radially inner spaces by the auxiliary salient poles in the rotor slots; and
the common windings are disposed in the radially inner spaces partitioned from the radially outer spaces by the auxiliary salient poles in the rotor slots.

11. The electromagnetic rotary electric machine according to claim 10, wherein:
the rotor windings include
first induction windings that are the induction windings each of which is wound around a distal end-side portion of a main salient pole of one group of every other one of the main salient poles in the circumferential direction of the rotor,
second induction windings that are the induction windings each of which is wound around the distal end-side portion of one of other main salient poles adjacent to the main salient poles around which the first induction windings are wound,
first common windings that are the common windings each of which is wound around a base-side portion of one of the main salient poles around which the first induction windings are wound, and second common windings that are the common windings each of which is wound around the base-side portion of one of the main salient poles around which the second induction windings are wound;

the first induction windings and the second induction windings are connected at a connecting point via respective rectification elements that are the magnetic characteristic adjustment portions and whose forward directions are opposite to each other; and a common winding set formed by connecting the first common windings and the second common windings in series is connected, at an end of the common winding set, to the connecting point, and is connected, at another end of the common winding set, to the first induction windings and to the second induction windings.

12. The electromagnetic rotary electric machine according to claim 11, wherein an end of the first induction windings that is not connected to the second induction windings is connected to one end of the second common windings, and the other end of the second common windings is connected to one end of the first common windings, wherein the other end of the first common windings is connected to the connecting point at which the magnetic characteristic adjustment portions are connected.

13. The electromagnetic rotary electric machine according to claim 1, wherein a width of each rotor winding in the circumferential direction of the rotor is shorter than a width that corresponds to 180° in electrical angle.

\* \* \* \* \*